US012625672B2

(12) United States Patent
Park et al.

(10) Patent No.: US 12,625,672 B2
(45) Date of Patent: May 12, 2026

(54) SERVER AND ELECTRONIC DEVICE FOR PROCESSING USER UTTERANCE AND OPERATING METHOD THEREOF BY SELECTING AMONG A PLURALITY OF ELECTRONIC DEVICES ONE DEVICE BASED ON A SUM OF SCORES

(71) Applicant: Samsung Electronics Co., Ltd., Suwon-si (KR)

(72) Inventors: Sangmin Park, Suwon-si (KR); Jaeyung Yeo, Suwon-si (KR); Gajin Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 766 days.

(21) Appl. No.: 17/891,676

(22) Filed: Aug. 19, 2022

(65) Prior Publication Data

US 2023/0095294 A1 Mar. 30, 2023

Related U.S. Application Data

(63) Continuation of application No. PCT/KR2022/010924, filed on Jul. 26, 2022.

(30) Foreign Application Priority Data

Sep. 24, 2021 (KR) ........................ 10-2021-0126219

(51) Int. Cl.
*G06F 3/16* (2006.01)
*G06F 1/26* (2006.01)
(Continued)

(52) U.S. Cl.
CPC .......... *G06F 3/167* (2013.01); *G06F 3/04842* (2013.01); *G10L 15/1815* (2013.01);
(Continued)

(58) Field of Classification Search
CPC ...... G06F 3/165; G06F 3/167; G06F 3/04842; G10L 15/1815
See application file for complete search history.

(56) References Cited

U.S. PATENT DOCUMENTS

| 10,482,904 B1 | 11/2019 | Hardie et al. | |
| 2018/0270291 A1* | 9/2018 | Burton | .................... G06F 1/266 |
| 2020/0401370 A1* | 12/2020 | Shetty | .................... G10L 15/22 |

FOREIGN PATENT DOCUMENTS

| KR | 10-2017-0086814 A | 7/2017 |
| KR | 10-2018-0083587 A | 7/2018 |

(Continued)

*Primary Examiner* — Farzad Kazeminezhad
(74) *Attorney, Agent, or Firm* — Jefferson IP Law, LLP

(57) ABSTRACT

An intelligent server for processing a user utterance is provided. The intelligent server includes a memory configured to store context information including information on electronic devices and information on domains corresponding to the electronic devices, and a processor configured to, based on a target utterance received from any one of the one or more electronic device and the context information, generate combinations of electronic device information and domain information capable of processing the target utterance, determine reference information for processing the target utterance among the context information, and calculate a quality of service score for each combination referring to the reference information, determine a target combination of a target electronic device and a target domain corresponding to the target electronic device based on the quality of service score, and transmit a command to process the target utterance with the target domain, to the target electronic device.

22 Claims, 10 Drawing Sheets

(51) Int. Cl.

| | | |
|---|---|---|
| *G06F 1/32* | (2019.01) | |
| *G06F 3/04842* | (2022.01) | |
| *G10L 15/18* | (2013.01) | |
| *G10L 15/22* | (2006.01) | |

(52) U.S. Cl.
   CPC .............. *G10L 15/22* (2013.01); *G06F 1/266* (2013.01); *G06F 1/32* (2013.01); *G06F 3/165* (2013.01)

(56)                References Cited

FOREIGN PATENT DOCUMENTS

| | | | | | |
|---|---|---|---|---|---|
| KR | 10-2018-0115628 | A | 10/2018 | | |
| KR | 10-2102246 | B1 | 4/2020 | | |
| KR | 10-2020-0074680 | A | 6/2020 | | |
| KR | 10-2178738 | B1 | 11/2020 | | |
| WO | WO2018131775 | A1 * | 7/2018 | ............... | G06F 1/32 |

* cited by examiner

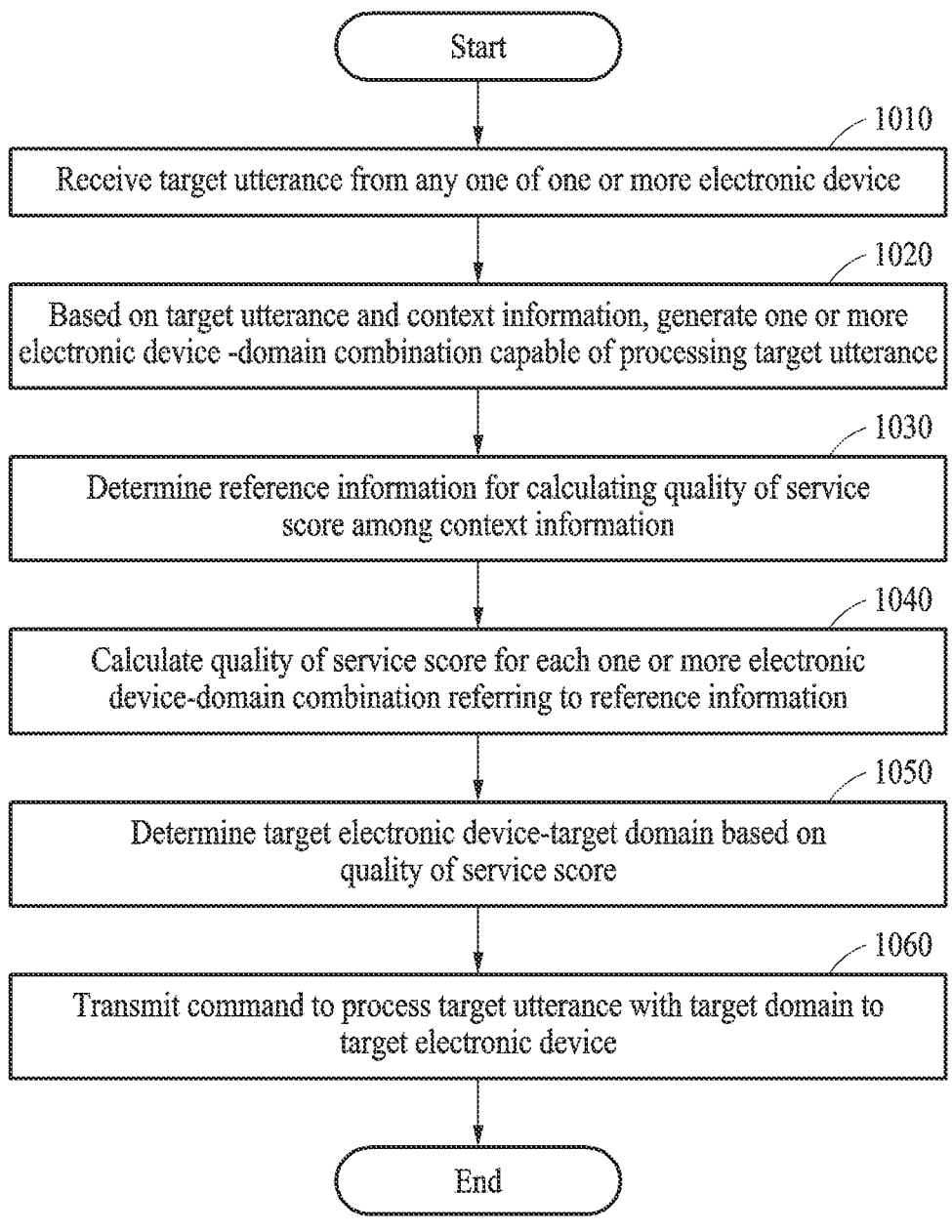

Start

Receive target utterance from any one of one or more electronic device ⟋ 1010

Based on target utterance and context information, generate one or more electronic device -domain combination capable of processing target utterance ⟋ 1020

Determine reference information for calculating quality of service score among context information ⟋ 1030

Calculate quality of service score for each one or more electronic device-domain combination referring to reference information ⟋ 1040

Determine target electronic device-target domain based on quality of service score ⟋ 1050

Transmit command to process target utterance with target domain to target electronic device ⟋ 1060

End

FIG. 10

SERVER AND ELECTRONIC DEVICE FOR PROCESSING USER UTTERANCE AND OPERATING METHOD THEREOF BY SELECTING AMONG A PLURALITY OF ELECTRONIC DEVICES ONE DEVICE BASED ON A SUM OF SCORES

CROSS-REFERENCE TO RELATED APPLICATION(S)

This application is a continuation application, claiming priority under § 365(c) of an International application No. PCT/KR2022/010924, filed on Jul. 26, 2022, which is based on and claims the benefit of a Korean patent application number 10-2021-0126219, filed on Sep. 24, 2021, in the Korean Intellectual Property Office, the disclosure of which is incorporated by reference herein in its entirety.

BACKGROUND

1. Field

The disclosure relates to an intelligent server and an electronic device for processing a user utterance and an operating method thereof.

2. Description of Related Art

Electronic devices including a voice assistant function that provides a service based on user utterance are being widely distributed. The electronic device may recognize the user utterance through an artificial intelligence server and may figure out the meaning and intent of the user utterance. The artificial intelligence server may infer an intent of a user by interpreting an utterance of the user, perform tasks according to the inferred intent, and perform tasks according to the intent of the user expressed through interaction, in a natural language, between the user and the artificial intelligence server.

At the moment an utterance is made, the artificial intelligence server may analyze various pieces of information on a situation related to the utterance to figure out an intent of the utterance.

The above information is presented as background information only to assist with an understanding of the disclosure. No determination has been made, and no assertion is made, as to whether any of the above might be applicable as prior art with regard to the disclosure.

SUMMARY

As electronic devices capable of performing various functions, such as smart watches, smart refrigerators, and/or smart speakers, are increasing, it is becoming important for an artificial intelligence server to be able to determine which device is to process an utterance.

An artificial intelligence server may determine which electronic device to process a user utterance has priority according to a predefined policy, and after the electronic device to process the user utterance is determined, the server may determine an application of the electronic device to process the user utterance. For example, after the electronic device is determined, an application to process the utterance among applications in the electronic device may be determined by classifying an intent of the user utterance.

However, a method of determining the application to process the utterance in the electronic device after the electronic device is determined, only considers whether the application supports the utterance, and does not consider the service quality of the application.

Aspects of the disclosure are to address at least the above-mentioned problems and/or disadvantages and to provide at least the advantages described below. Accordingly, an aspect of the disclosure is to provide a server and electronic device for processing user utterance and operating method thereof.

Additional aspects will be set forth in part in the description which follows and, in part, will be apparent from the description, or may be learned by practice of the presented embodiments.

In accordance with an aspect of the disclosure, an intelligent server for processing a user utterance is provided. The intelligent server includes a memory configured to store context information including information on each of at least one electronic device and information on at least one domain corresponding to each of the one or more of electronic device, and a processor configured to, based on a target utterance received from any one of the one or more electronic device and the context information, generate at least one combination of electronic device information and domain information capable of processing the target utterance, determine reference information for processing the target utterance among the context information, calculate a quality of service score for each of the one or more combination referring to the reference information, determine a target combination of a target electronic device and a target domain corresponding to the target electronic device based on the quality of service score, and transmit a command to process the target utterance with the target domain, to the target electronic device.

In accordance with an aspect of the disclosure, a method for processing a user utterance in an intelligent server is provided. The method includes receiving a target utterance from any one of at least one electronic device, generating at least one combination of electronic device information and domain information, capable of processing the target utterance, based on the target utterance and context information, the context information including information on each of the at least one electronic device and information on at least one domain corresponding to each of the one or more electronic device, determining reference information for processing the target utterance among the context information, calculating a quality of service score for each of the one or more combination referring to the reference information, determining a at least one target combination of a target electronic device and a target domain corresponding to the target electronic device based on the quality of service score, and transmitting a command to process the target utterance with the target domain, to the target electronic device.

In accordance with an aspect of the disclosure, an electronic device for processing a user utterance is provided. The electronic device includes a memory configured to store context information including information on each of at least one electronic device including the electronic device and information on at least one domain corresponding to each of the one or more of electronic device, and computer-executable instructions, and a processor configured to, based on a target utterance received from the electronic device and the context information, generate at least one combination of electronic device information and domain information capable of processing the target utterance, determine reference information for processing the target utterance among the context information, calculate a quality of service score for each of the at least one combination referring to the reference information, determine a target combination of a target electronic device and a target domain corresponding to the target electronic device based on the quality of service score, and transmit a command to process the target utterance with the target domain, to the target electronic device.

According to various embodiments, an intelligent server and an electronic device that process an utterance by considering the service quality of the electronic device and application may be provided.

According to various embodiments, a better user experience may be provided by classifying a user intent based on a combination of the electronic device and the application without having to classify the user intent for each electronic device.

According to various embodiments, by classifying a user intent based on a combination of the electronic device and the application without classifying the user intent for each electronic device, the configuration of a user intent classifier may be simplified, the learning time may be shortened, and a consistent response may be possible.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which:

FIG. 10 is a flowchart illustrating an operation of processing an utterance by an intelligent server, according to embodiment of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Electronic Device and Intelligent Server

Figure 1:
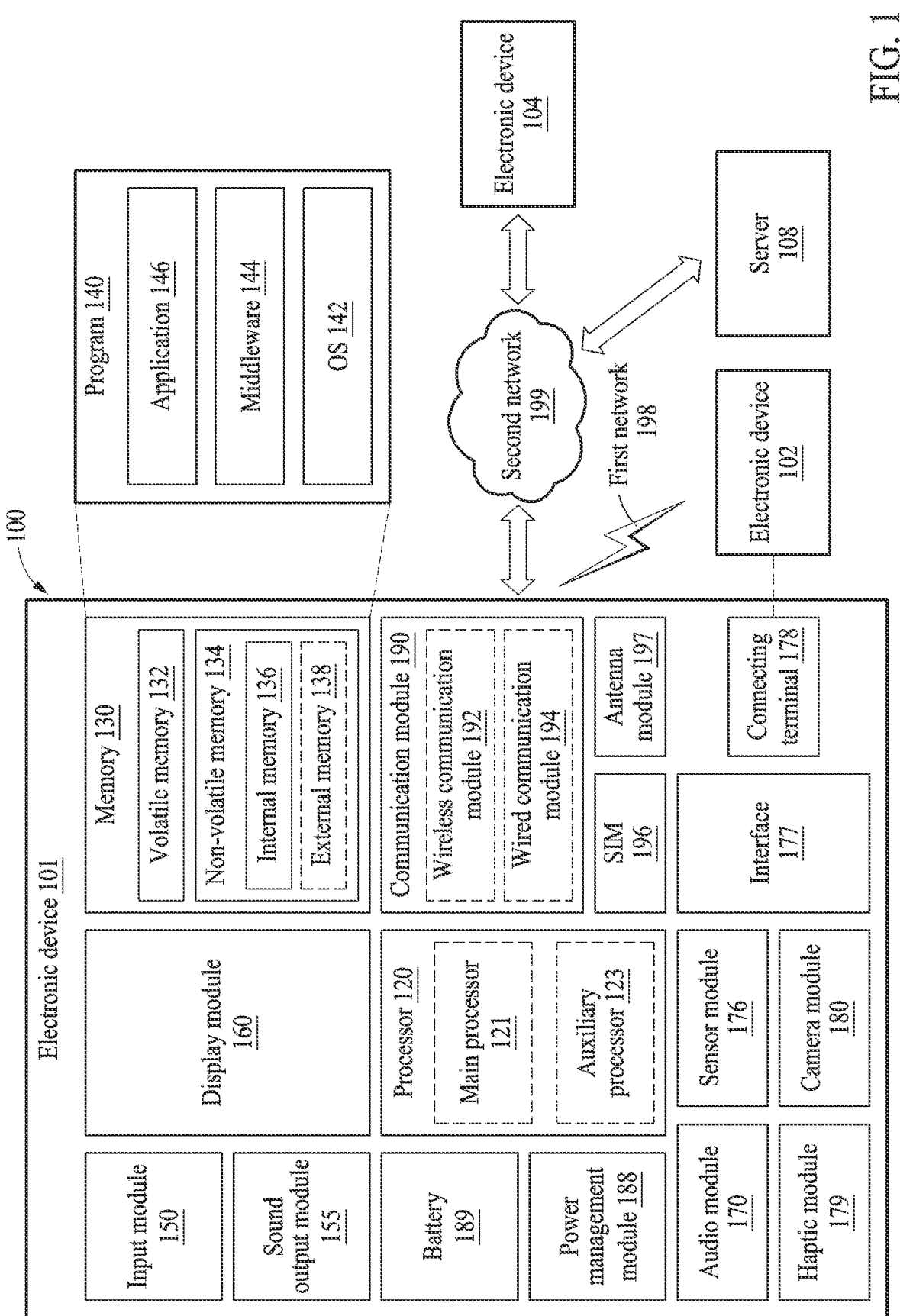
FIG. 1 is a block diagram illustrating an electronic device in a network environment, according to an embodiment of the disclosure.

FIG. 1 is a block diagram illustrating an electronic device in a network environment, according to an embodiment of the disclosure.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An artificial intelligence (AI) model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning algorithms. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure the intensity of force applied by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a Hall sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, Wi-Fi direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to various embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be the same in type as electronic device 101 or different in type than electronic device 101. According to an embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may transmit a request to one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, for example, distributed computing or mobile edge computing. In an example embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
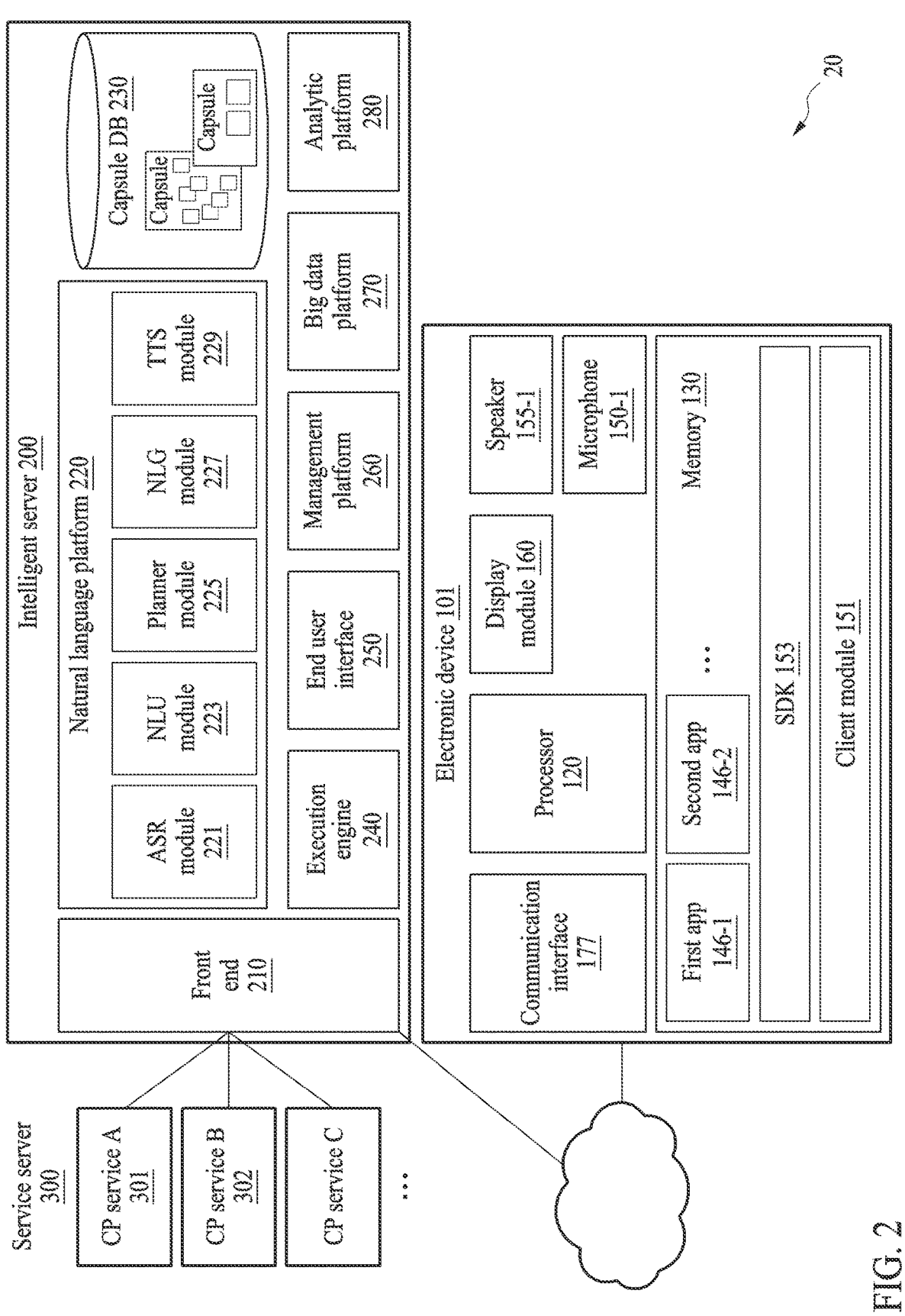
FIG. 2 is a block diagram illustrating an integrated intelligence system according to an embodiment of the disclosure.

FIG. 2 is a block diagram illustrating an integrated intelligence system according to an embodiment of the disclosure.

Referring to FIG. 2, an integrated intelligence system 20 may include an electronic device 101, an intelligent server 200, and a service server 300.

The electronic device 101 may be a terminal device (or an electronic device) connectable to the Internet, and may be a mobile phone, a smartphone, a personal digital assistant (PDA), a notebook computer, a television (TV), a white home appliance, a wearable device, a head-mounted display (HMD), or a smart speaker.

As shown in FIG. 2, the electronic device 101 may include an interface 177, a microphone 150-1, a speaker 155-1, a display module 160, a memory 130, or a processor 120. The components listed above may be operationally or electrically connected to each other. The microphone 150-1 may be included in an input module (e.g., the input module 150 of FIG. 1). The speaker 155-1 may be included in a sound output module (e.g., the sound output module 155 of FIG. 1).

The interface 177 may be connected to an external device and configured to transmit and receive data to and from the external device. The microphone 150-1 may receive a sound (e.g., a user utterance) and convert the sound into an electrical signal. The speaker 155-1 may output the electrical signal as a sound (e.g., speech). The display module 160 may be configured to display an image or video. The display module 160 may also display a graphical user interface (GUI) of an app (or an application program) being executed.

The memory 130 may store a client module 151, a software development kit (SDK) 153, and a plurality of apps 146. The client module 151 and the SDK 153 may configure a framework (or a solution program) for performing general-purpose functions. In addition, the client module 151 or the SDK 153 may configure a framework for processing a voice input.

The plurality of apps 146 stored in the memory 130 may be programs for performing designated functions. The plurality of apps 146 may include a first app 146-1 and a second app 146-2. Each of the plurality of apps 146 may include a plurality of actions for performing a designated function. For example, the apps may include an alarm app, a messaging app, and/or a scheduling app. The plurality of apps 146 may be executed by the processor 120 to sequentially execute at least a portion of the plurality of actions.

The processor 120 may control the overall operation of the electronic device 101. For example, the processor 120 may be electrically connected to the interface 177, the microphone 150-1, the speaker 155-1, and the display module 160 to perform a designated operation.

The processor 120 may also perform the designated function by executing the program stored in the memory 130. For example, the processor 120 may execute at least one of the client module 151 or the SDK 153 to perform the following operation for processing a voice input. The processor 120 may control the operation of the plurality of apps 146 through, for example, the SDK 153. The following operation which is the operation of the client module 151 or the SDK 153 may be performed by the processor 120.

The client module 151 may receive a voice input. For example, the client module 151 may receive a voice signal corresponding to a user utterance sensed through the microphone 150-1. The client module 151 may transmit the received voice input to the intelligent server 200. The client module 151 may transmit state information of the electronic device 101 together with the received voice input to the intelligent server 200. The state information may be, for example, execution state information of an app.

The client module 151 may receive a result corresponding to the received voice input. For example, when the intelligent server 200 is capable of calculating a result corresponding to the received voice input, the client module 151 may receive the result corresponding to the received voice input. The client module 151 may display the received result on the display module 160.

The client module 151 may receive a plan corresponding to the received voice input. The client module 151 may display the results of executing a plurality of actions of an app according to the plan on the display module 160. The client module 151 may, for example, sequentially display the results of executing the plurality of actions on the display module 160. As another example, the electronic device 101 may display only a partial result of executing the plurality of actions (e.g., a result of the last action) on the display module 160.

The client module 151 may receive a request to obtain information necessary for calculating a result corresponding to the voice input from the intelligent server 200. According to an example embodiment, the client module 151 may transmit the necessary information to the intelligent server 200 in response to the request.

The client module 151 may transmit information on the results of executing the plurality of actions according to the plan to the intelligent server 200. The intelligent server 200 may confirm that the received voice input has been correctly processed using the information on the results.

The client module 151 may include a speech recognition module. The client module 151 may recognize a voice input for performing a limited function through the speech recognition module. For example, the client module 151 may execute an intelligent app for processing a voice input to perform an organic operation through a designated input (e.g., Wake up!).

The intelligent server 200 may receive information related to a user voice input from the electronic device 101 through a communication network. The intelligent server 200 may change data related to the received voice input into text data. The intelligent server 200 may generate a plan for performing a task corresponding to the user voice input based on the text data.

The plan may be generated by an artificial intelligence (AI) system. The AI system may be a rule-based system, or a neural network-based system (e.g., a feedforward neural network (FNN) or a recurrent neural network (RNN)). Alternatively, the AI system may be a combination thereof or other artificial intelligence systems. According to an embodiment of the disclosure, the plan may be selected from a set of predefined plans or may be generated in real time in response to a user request. For example, the AI system may select at least one plan from among the predefined plans.

The intelligent server 200 may transmit a result according to the generated plan to the electronic device 101 or transmit the generated plan to the electronic device 101. The electronic device 101 may display the result according to the plan on the display module 160. The electronic device 101 may display a result of executing an action according to the plan on the display module 160.

The intelligent server 200 may include a front end 210, a natural language platform 220, a capsule database (DB) 230, an execution engine 240, an end user interface 250, a management platform 260, a big data platform 270, or an analytic platform 280.

The front end 210 may receive the received voice input from the electronic device 101. The front end 210 may transmit a response corresponding to the voice input.

The natural language platform 220 may include an automatic speech recognition (ASR) module 221, a natural language understanding (NLU) module 223, a planner module 225, a natural language generator (NLG) module 227, or a text-to-speech (TTS) module 229.

The ASR module 221 may convert the voice input received from the electronic device 101 into text data. The NLU module 223 may discern an intent of a user using the text data of the voice input. For example, the NLU module 223 may discern the intent of the user by performing syntactic analysis or semantic analysis. The NLU module 223 may discern the meaning of a word extracted from the voice input using a linguistic feature (e.g., a grammatical element) of a morpheme or phrase, and determine the intent of the user by matching the discerned meaning of the word to an intent.

The planner module 225 may generate a plan using a parameter and the intent determined by the NLU module 223. The planner module 225 may determine a plurality of domains required to perform a task based on the determined intent. The planner module 225 may determine a plurality of actions included in each of the plurality of domains determined based on the intent. The planner module 225 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the intent of the user. The planner module 225 may determine a relationship between the plurality of actions and the plurality of concepts stepwise (or hierarchically). For example, the planner module 225 may determine an execution order of the plurality of actions determined based on the intent of the user, based on the plurality of concepts. In other words, the planner module 225 may determine the execution order of the plurality of actions based on the parameter required for the execution of the plurality of actions and results output by the execution of the plurality of actions. Accordingly, the planner module 225 may generate a plan including connection information (e.g., ontology) between the plurality of actions and the plurality of concepts. The planner module 225 may generate the plan using information stored in the capsule DB 230 that stores a set of relationships between concepts and actions.

The NLG module 227 may change designated information into a text form. The information changed to the text form may be in the form of a natural language utterance. The TTS module 229 may change information in a text form into information in a speech form.

According to an embodiment of the disclosure, some or all of the functions of the natural language platform 220 may be implemented in the electronic device 101 as well.

The capsule DB 230 may store information on the relationship between the plurality of concepts and actions corresponding to the plurality of domains. A capsule may include a plurality of action objects (or action information) and concept objects (or concept information) included in the plan. The capsule DB 230 may store a plurality of capsules in the form of a concept action network (CAN). According to an example embodiment, the plurality of capsules may be stored in a function registry included in the capsule DB 230.

The capsule DB 230 may include a strategy registry that stores strategy information necessary for determining a plan corresponding to a voice input. The strategy information may include reference information for determining one plan when there are a plurality of plans corresponding to the voice input. The capsule DB 230 may include a follow-up registry that stores information on follow-up actions for suggesting a follow-up action to the user in a designated situation. The follow-up action may include, for example, a follow-up utterance. The capsule DB 230 may include a layout registry that stores layout information of information outputted through the electronic device 101. The capsule DB 230 may include a vocabulary registry that stores vocabulary information included in capsule information. The capsule DB 230 may include a dialog registry that stores information on a dialog (or an interaction) with the user.

The capsule DB 230 may update the stored objects through a developer tool. The developer tool may include, for example, a function editor for updating an action object or a concept object. The developer tool may include a vocabulary editor for updating the vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition. According to an embodiment of the disclosure, the capsule DB 230 may be implemented in the electronic device 101 as well.

The execution engine 240 may calculate a result using the generated plan. The end user interface 250 may transmit the calculated result to the electronic device 101. Accordingly, the electronic device 101 may receive the result and provide the received result to the user. The management platform 260 may manage information used by the intelligent server 200. The big data platform 270 may collect data of the user. The analytic platform 280 may manage a quality of service (QoS) of the intelligent server 200. For example, the analytic platform 280 may manage the components and processing rate (or efficiency) of the intelligent server 200.

The service server 300 may provide a designated service, such as a food order (CP service A 301) or hotel reservations (CP service B 302) to the electronic device 101. The service server 300 may be a server operated by a third party. The service server 300 may provide information to be used for generating a plan corresponding to the received voice input to the intelligent server 200. The provided information may be stored in the capsule DB 230. In addition, the service server 300 may provide result information according to the plan to the intelligent server 200.

In the integrated intelligence system 20 described above, the electronic device 101 may provide various intelligent services to the user in response to a user input. The user input may include, for example, an input through a physical button, a touch input, or a voice input.

The electronic device 101 may provide a speech recognition service through an intelligent app (or a speech recognition app) stored therein. In this example, the electronic device 101 may recognize a user utterance or a voice input received through the microphone, and provide a service corresponding to the recognized voice input to the user.

The electronic device 101 may perform a designated action alone or together with the intelligent server 200 and/or a service server 300, based on the received voice input. For example, the electronic device 101 may execute an app corresponding to the received voice input and perform a designated action through the executed app.

When the electronic device 101 provides a service together with the intelligent server 200 and/or the service server 300, the electronic device 101 may detect a user utterance using the microphone 150-1 and generate a signal (or voice data) corresponding to the detected user utterance. The electronic device 101 may transmit the voice data to the intelligent server 200 using the interface 177.

The intelligent server 200 may generate, as a response to the voice input received from the electronic device 101, a plan for performing a task corresponding to the voice input or a result of performing an action according to the plan. The plan may include, for example, a plurality of actions for performing a task corresponding to a voice input of a user, and a plurality of concepts related to the plurality of actions. The concepts may define parameters input to the execution of the plurality of actions or result values output by the execution of the plurality of actions. The plan may include connection information between the plurality of actions and the plurality of concepts.

The electronic device 101 may receive the response using the interface 177. The electronic device 101 may output a voice signal internally generated by the electronic device 101 to the outside using the speaker 155-1, or output an image internally generated by the electronic device 101 to the outside using the display module 160.

Figure 3:
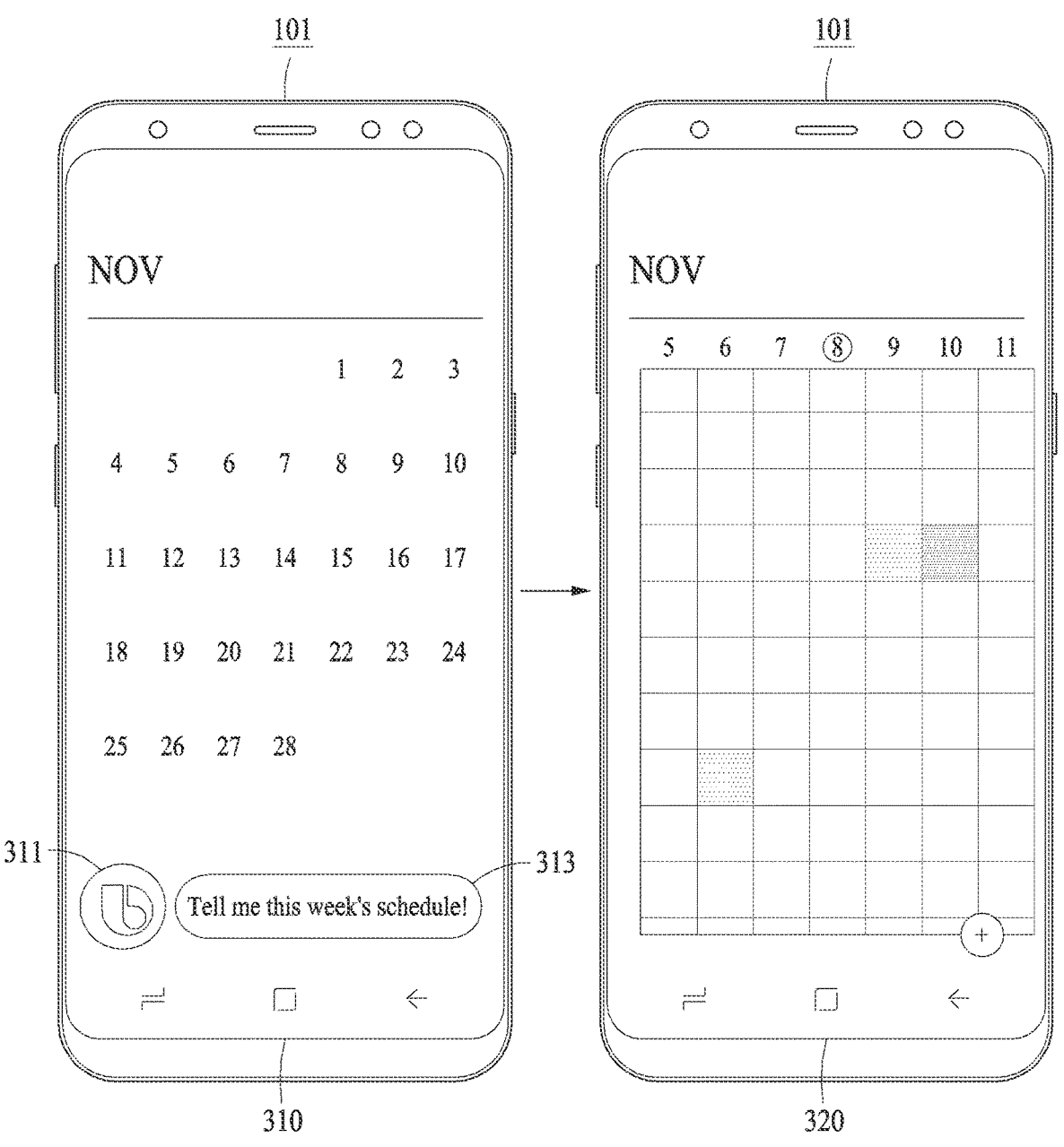
FIG. 3 is a diagram illustrating a user terminal displaying a screen for processing a voice input received through an intelligent app, according to an embodiment of the disclosure.

FIG. 3 is a diagram illustrating a screen of an electronic device processing a received voice input through an intelligent app, according to an embodiment of the disclosure.

An electronic device 101 may execute an intelligent app to process a user input through an intelligent server (e.g., the intelligent server 200 of FIG. 2).

Referring to FIG. 3, in screen 310, when a designated voice input (e.g., Wake up!) is recognized or an input through a hardware key (e.g., a dedicated hardware key) is received, the electronic device 101 may execute an intelligent app for processing the voice input. The electronic device 101 may execute the intelligent app, for example, in a state in which a scheduling app is executed. The electronic device 101 may display an object (e.g., an icon) 311 corresponding to the intelligent app on a display (e.g., the display module 160 of FIG. 1). The electronic device 101 may receive a voice input by a user utterance. For example, the electronic device 101 may receive a voice input of "Tell me this week's schedule!". The electronic device 101 may display a user interface (UI) 313 (e.g., an input window) of the intelligent app in which text data of the received voice input is displayed on the display.

In screen 320, the electronic device 101 may display a result corresponding to the received voice input on the display. For example, the electronic device 101 may receive a plan corresponding to the received user input, and display "this week's schedule" on the display according to the plan.

Figure 4:
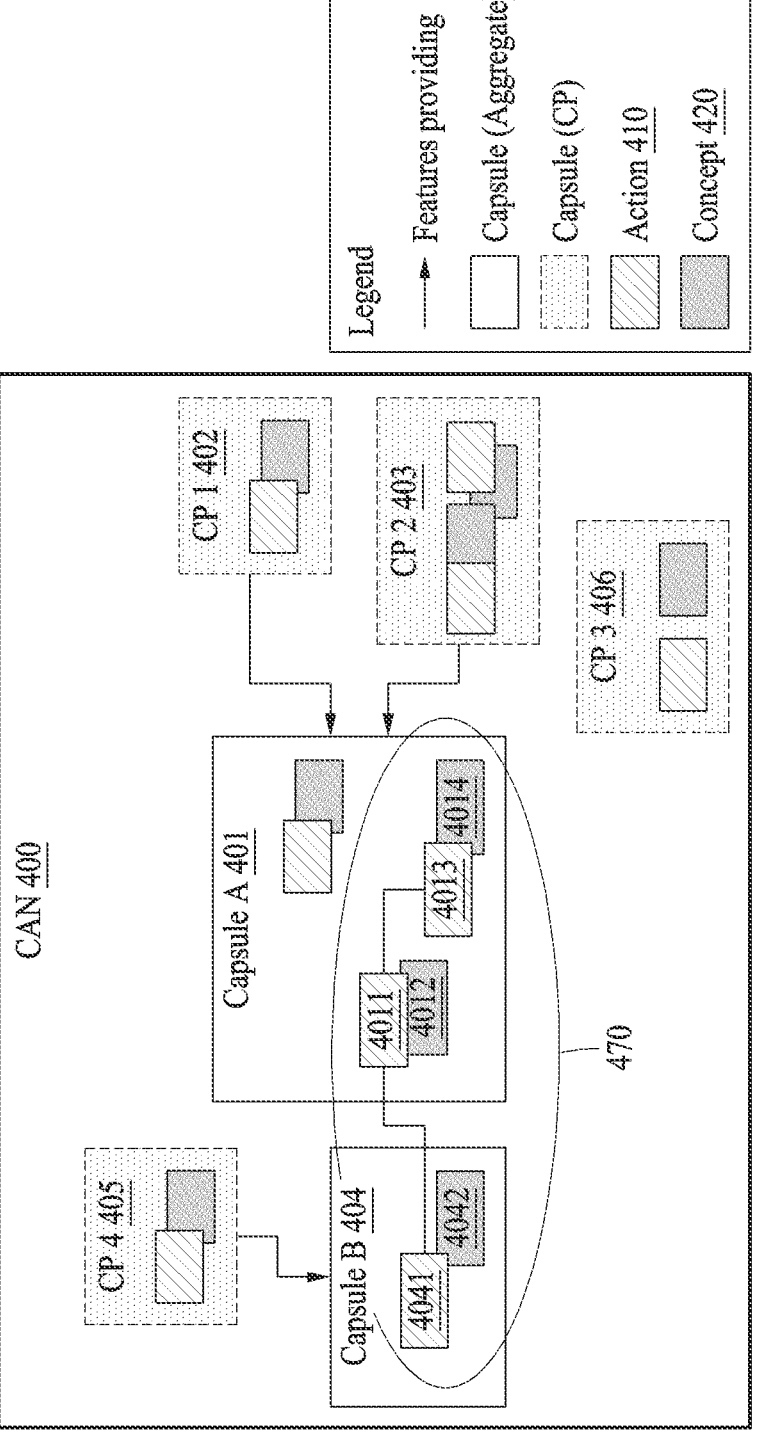
FIG. 4 is a diagram illustrating a form in which relationship information between concepts and actions is stored in a database, according to an embodiment of the disclosure.

FIG. 4 is a diagram illustrating a form in which relationship information between concepts and actions is stored in a database, according to an embodiment of the disclosure.

Referring to FIG. 4, a capsule DB (e.g., the capsule DB 230 of FIG. 2) of an intelligent server (e.g., the intelligent server 200 of FIG. 2) may store capsules in the form of a concept action network (CAN) 400. The capsule DB may store an action for processing a task corresponding to a voice input of a user and a parameter necessary for the action in the form of a CAN.

The capsule DB may store a plurality of capsules (a capsule A 401 and a capsule B 404) respectively corresponding to a plurality of domains (e.g., applications). One capsule (e.g., the capsule A 401) may correspond to one domain (e.g., a location (geo) or an application). The one capsule may also correspond to at least one service provider (e.g., CP 1 402, CP 2 403, or CP 4 405) for performing a function for a domain related to the capsule. One capsule may include at least one action 410 for performing a designated function and at least one concept 420. Other service providers, such as CP 3 406, need not correspond to any capsule.

A natural language platform (e.g., the natural language platform 220 of FIG. 2) may generate a plan for performing a task corresponding to the received voice input using the capsules stored in the capsule DB. For example, a planner module (e.g., the planner module 225 of FIG. 2) of the natural language platform may generate the plan using the capsules stored in the capsule DB. For example, a plan 470 may be generated using actions 4011 and 4013 and concepts 4012 and 4014 of the capsule A 401 and an action 4041 and a concept 4042 of the capsule B 404.

The electronic device may be one of various types of electronic devices. The electronic device may include a portable communication device (e.g., a smartphone), a computer device, a portable multimedia device, a portable medical device, a camera, a wearable device, or a home appliance device. The electronic device according to an example embodiment is not limited to those described above.

It should be understood that various example embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101 of FIG. 1). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™, or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same manner or in a similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 5:
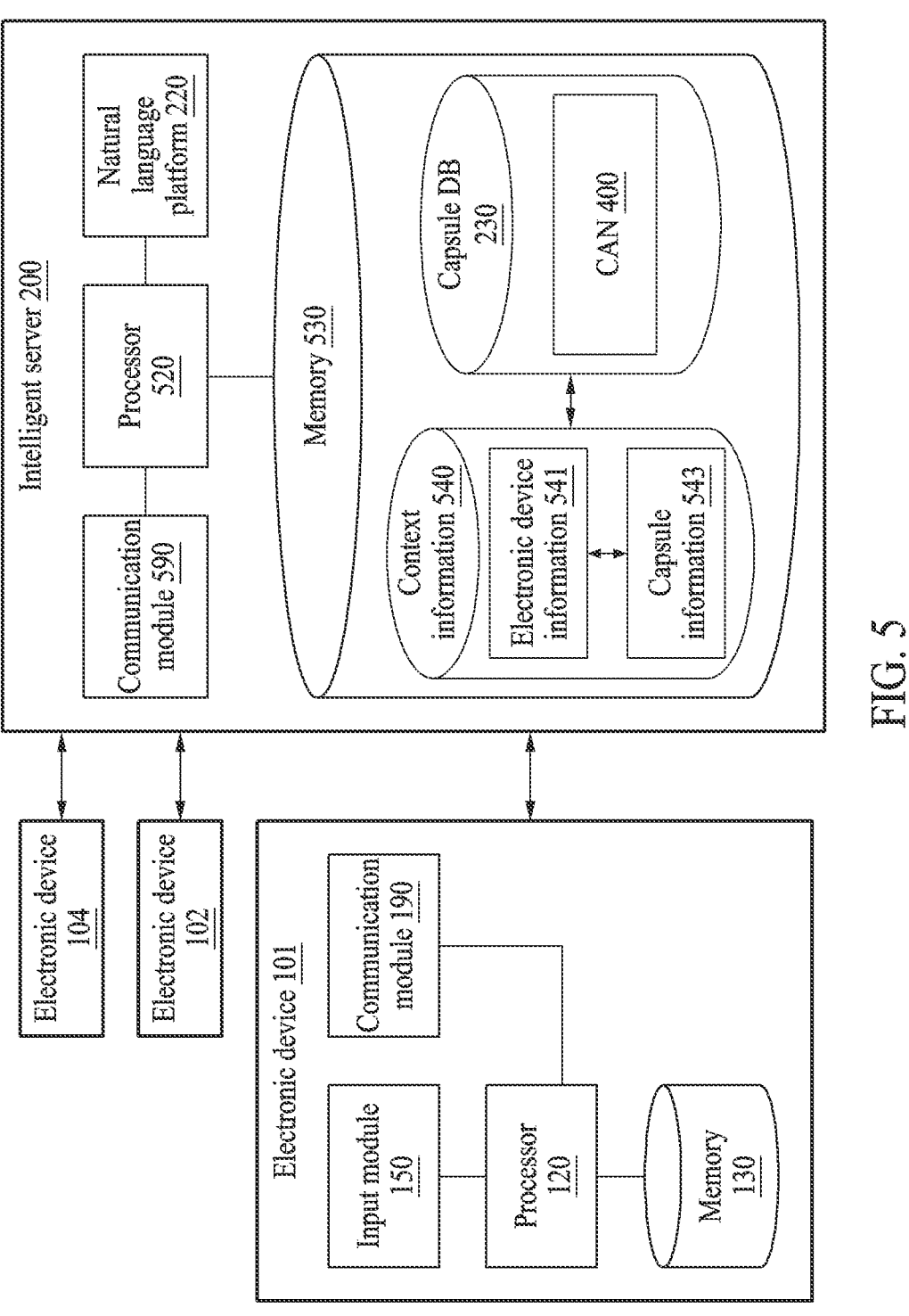
FIG. 5 is a block diagram illustrating an electronic device and an intelligent server, according to an embodiment of the disclosure.

FIG. 5 is a block diagram illustrating an electronic device and an intelligent server, according to an embodiment of the disclosure.

Electronic Device

Referring to FIG. 5, the electronic device 101 may include at least a part of the configurations of the electronic device 101 described with reference to FIG. 1 and the electronic device 101 described with reference to FIG. 2. The intelligent server 200 of FIG. 5 may include at least a part of the configuration of the intelligent server 200 described with reference to FIG. 2. With respect to the electronic device 101 and the intelligent server 200 of FIG. 5, the descriptions provided with reference to FIGS. 1 to 4 will not be repeated.

Referring to FIG. 5, the electronic device 101 may include an input module 150 for inputting a user utterance, a communication module 190 for communicating with the intelligent server 200 that processes the user utterance, a memory 130 for storing computer-executable instructions and/or a processor 120 for executing the computer-executable instructions by accessing the memory 130. According to an example embodiment, the electronic device 101, the input module 150, the communication module 190, the memory 130, and/or the processor 120 may respectively correspond to the electronic device 101, the input module 150, the communication module 190, the memory 130, and/or the processor 120 described with reference to FIG. 1. The electronic device 101 may be the electronic device 101 for communicating with the intelligent server 200 described with reference to FIG. 2, and the client module 151 may be included in the memory 130.

The processor 120 may receive a user utterance through the input module 150, and transmit information on the user utterance and the electronic device 101 to the intelligent server 200. The information on the electronic device 101 may include at least one of information on the specification of the electronic device 101, such as account information of the electronic device 101, information on a maximum volume to be supported by the electronic device 101, and/or information on whether the electronic device 101 is a professional device, information on whether the electronic device 101 is locked, information on a current position of the electronic device 101, information on a value set for a ringtone, and information on an application of the electronic device 101. However, the examples are not limited thereto, and the processor 120 may transmit various kinds of information on the electronic device 101 to the intelligent server 200.

The processor 120 may transmit information on a user utterance and the electronic device 101 to the intelligent server 200, through the communication module 190, and output a processing result of the utterance to a user based on an instruction received from the intelligent server 200.

Intelligent Server

The intelligent server 200 may include a natural language platform 220, a capsule DB 230, a communication module 590, a processor 520, and/or a memory 530. The intelligent server 200 may be the intelligent server 200 described with reference to FIG. 2, and the communication module 590, the processor 520, the memory 530, the natural language platform 220, and/or the capsule DB 230 may correspond to the configuration of the intelligent server 200 of FIG. 2.

The communication module 590 may correspond to the front end 210 of FIG. 2. The processor 520 may receive information on a user utterance and the electronic device 101 from the electronic device 101 through the communication module 590. The intelligent server 200 may receive, from the electronic device 101 and other electronic devices 102 and 104 connected to the electronic device 101, information (e.g., specification information of the electronic device or information on applications installed in the electronic device) on the electronic devices 102 and 104 through the communication module 590. For example, a user may use various electronic devices, such as an intelligent speaker 102, a smart watch 104, and/or a smart TV, corresponding to a user account of the electronic device 101 (e.g., a smartphone), and the intelligent server 200 may receive, from the smartphone 101 as well as the intelligent speaker 102 and/or the smart watch 104, specification information of the electronic device or performance information on the applications installed in the electronic device, and retain the received information in context information 540. The context information 540 may retain information 541 on the electronic devices 101, 102, and 104 and information 543 on capsules corresponding to each electronic device, such as information on the applications included in the electronic device.

The processor 520 may generate a result of processing an utterance received from the electronic device 101 and transmit the processing result to the electronic device 101 through the communication module 590.

The natural language platform 220, as described with reference to FIG. 2, may include an ASR module 221, an NLU module 223, a planner module 225, an NLG module 227, and a TTS module 229. According to an example embodiment, the memory 530 may include the capsule DB 230. As described with reference to FIG. 2, the capsule DB 230 may store an action for processing a task corresponding to a voice input of a user and a parameter necessary for the action in the form of a CAN 400. The CAN 400 may be configured as described with reference to FIG. 4.

The memory 530 of the intelligent server 200 may store the context information 540. The context information 540 may include information 541 on the electronic devices 101, 102, and 104 and capsule information 543 corresponding to the electronic devices 101, 102, and 104. As described with reference to FIGS. 2 to 4, the capsule information 543 may correspond to domain (e.g., a location (geo) or an application) information. The domain information may be software for processing a target utterance through the electronic device 101, and may include at least one of an application downloadable to the electronic devices 101, 102, and 104, a program providing a service in a form of a widget, and a web app.

The context information 540 may be divided into permanent context information that does not change in real time and instant context information that does change in real time. The permanent context information may include at least one of network information on one or more of electronic devices 101, 102, and 104, account information on one or more of electronic devices 101, 102, and 104, information on whether the one or more of electronic devices 101, 102, and 104 is a professional device, and performance information on one or more domain. The instant context information may include at least one of user preference information of one or more domain, execution history information of one or more domain, and utterance history information received by the one or more of electronic devices 101, 102, and 104.

The permanent context information may be transmitted from the electronic device to the intelligent server 200 when the electronic devices 101, 102, and 104 are first connected to the intelligent server 200, and may be maintained in the memory 530 of the intelligent server 200. The instant context information may be transmitted from the electronic devices 101, 102, and 104 to the intelligent server 200 periodically or according to a request.

The context information may be temporarily stored in a cache included in the memory 530 of the intelligent server 200, and the processor 520 may directly acquire the context information cached in the memory 530 as needed without receiving the context information from the electronic device.

Although the context information 540 and the capsule DB 230 are separately illustrated in FIG. 5, the examples are not limited thereto, and the context information 540 may be included in the capsule DB 230.

The memory 530 for storing computer-executable instructions and the processor 520 for executing the computer-executable instructions by accessing the memory 530 may correspond to the natural language platform 220 or the execution engine 240 of the intelligent server 200 described with reference to FIG. 2. For example, the processor 520 may generate a plan referring to the capsule DB 230 or the context information 540 as described with reference to the natural language platform 220 of FIG. 2, and may generate a processing result according to the plan as described with reference to the execution engine 240 of FIG. 2.

The processor 520 may receive a target utterance from the electronic device 101 through the communication module 590, generate a result of processing the target utterance referring to the natural language platform 220, the capsule DB 230, and the context information 540, and transmit the generated processing result to the electronic device 101.

According to an embodiment of the disclosure, a program (e.g., the program 140 of FIG. 1) for generating an electronic device-domain combination capable of processing a target utterance based on a target utterance received from any one of the one or more of electronic devices 101, 102, and 104 and the context information 540, and for determining a target electronic device and a target domain to process the target utterance by calculating a quality of service score for each combination, may be stored in the memory 530 as software.

According to an embodiment of the disclosure, an on-device AI for processing an utterance without communication with the intelligent server 200 may be included in the electronic device 101. As described with reference to FIGS. 2 to 4, the natural language platform 220 and/or the capsule DB 230 may be implemented in the electronic device 101, and the context information 540 may also be included in the memory 130 of the electronic device 101. A program (e.g., the program 140 of FIG. 1) for generating an electronic device-domain combination capable of processing a target utterance based on a target utterance received from a user and the context information 540, and for determining a target electronic device and a target domain to process the target utterance by calculating a quality of service score for each combination, may be stored as software in the memory 130 of the electronic device 101.

When an on-device AI is included in the electronic device 101 and functions of an intelligent server are implemented in the electronic device 101, only some of the functions of the intelligent server may be implemented in the electronic device 101. For example, only a part of the configuration (e.g., the ASR module 221) of the natural language platform 220 of the intelligent server 200 described with reference to FIG. 2 may be implemented in the electronic device 101. For example, the electronic device 101 may include only the natural language platform 220 of the intelligent server 200, while the capsule DB 230 or the context information 540 may be maintained in the intelligent server 200.

The processor 520 of the intelligent server 200 may generate one or more combinations of electronic device information 541-capsule information 543 (or domain information) capable of receiving a target utterance from any one of one or more of the electronic devices 101, 102, and 104 (e.g., the electronic device 101 in FIG. 5) and processing the target utterance based on the target utterance and the context information 540. For example, with respect to the target utterance "Play music at maximum volume", the processor 520 may generate combinations such as a smartphone-music app, a smartphone-media player app, an intelligent speaker-music app, an intelligent speaker-media player app, a smart refrigerator-music app, and a smart air conditioner-music app combination capable of processing the target utterance based on the natural language platform 220, the capsule DB 230, and the context information 540.

The processor 520 may determine reference information for processing a target utterance among the context information 540. For example, with respect to a target utterance "Play music at maximum volume", the processor 520 may determine maximum volume information of the electronic devices 101, 102, and 104 among the electronic device information 541 to be reference information, and determine "whether an amplification function exists" to be reference information among the capsule information 543 (or domain information) corresponding to the electronic devices 101, 102, and 104. The reference information may be predetermined based on the target utterance, and may be determined by analyzing the target utterance referring to the natural language platform 220.

The processor 520 may calculate a quality of service score for each of one or more electronic device-domain combination referring to the reference information, and determine the combination with the highest quality of service score to be the target combination to determine the target electronic device and the target domain.

With respect to each of one or more combination, the processor 520 may calculate the quality of service score by the sum of a controllability score, a functionality score, an accessibility score, and a functional performance robustness score as shown in Equation 1 below, and determine the combination having the highest quality of service score to be the target combination as shown in Equation 2 below.

$$\text{Score}_{QoS} = \text{Score}_{controllability} + \hspace{2em} \text{Equation 1}$$
$$\text{Score}_{functionality} + \text{Score}_{accessibility} + \text{Score}_{robustness}$$

$$\text{Score}_{selected-device-capsule} = \max\left(\text{Score}_{QoS}^{n_{device-capsule}}\right), \hspace{1em} \text{Equation 2}$$
$$n_{device-capsule} = 1 \ ... \ N$$

The processor 520 may determine the controllability score to be high when the degree of the controllability of a combination of an electronic device and a corresponding domain is high. For example, with respect to a target utterance "Record my voice loudest", the processor 520 may determine the controllability score to be high for a combination of an electronic device having a maximum input sensitivity and a domain having a sound source amplification function.

The processor 520 may determine the functionality score to be high when there are many shareable electronic devices or domains. For example, with respect to a target utterance "Please share", the processor 520 may determine the functionality score to be high for an electronic device-domain combination having a high sharing frequency and many shareable media.

The processor 520 may determine the accessibility score to be high when automatic login is applied or when there are only a few authentication steps. For example, with respect to an utterance related to a personal account, such as "Send email", the processor 520 may determine the accessibility score to be high in the case of a smartphone-email app combination since an authentication process for a family device such as a TV is more complicated than that of a personal device such as a smartphone.

The processor 520 may determine the function performance robustness score to be high when there are few collisions between domains while a function is being performed. For example, if there is a subsequent utterance of "song title" after an utterance "Play 'I'm going to see you now'", since a conflict between domains may occur in case there is a movie of the same name and a song of the same name, the processor 520 may determine the function performance robustness score to be high for an intelligent speaker-music app combination among a smart TV-media app combination and the intelligent speaker-music app combination.

The processor 520 may set different weights for the controllability score, the functionality score, the accessibility score, and the functional performance robustness score. For example, the processor 520 may calculate a quality of service score by setting a weight to be high for an accessibility score and a functional performance robustness score for utterances such as "share ~" or "log in ~".

However, the calculation process of the quality of service score is not limited to the above-described method, and the processor 520 may determine a target combination of a target electronic device-target domain by calculating the quality of service score for the combination in various ways. According to an embodiment of the disclosure, an internal policy (not shown) for natural language processing may be stored in the memory 530, and the processor 520 may refer to the internal policy when calculating the quality of service score. For example, in addition to the aforementioned controllability score, functionality score, accessibility score, and functional performance robustness score, a developer may define and add items related to the quality of service score to the internal policy, and the processor 520 may calculate the quality of service score for an electronic device-domain combination by considering the added items.

The processor 520 may transmit a command to process a target utterance with a target domain of the target electronic device, to the target electronic device. The target electronic device may process the utterance with the target domain and output a result to the user.

The computer-executable instructions stored in the memory 530 or the memory 130 may be implemented as one function module in the OS 142, implemented in a form of the middleware 144, or implemented in a separate application (e.g., the application 146).

Hereinafter, referring to FIGS. 6 to 9, various embodiments of the processor 120 of the electronic device 101 or the processor 520 of the intelligent server 200 generating an electronic device-domain combination capable of processing a target utterance based on the target utterance received from a user and the context information 540, and determining a target electronic device and a target domain to process the target utterance by calculating a quality of service score for each combination, are described in detail.

FIGS. 6 to 9 are diagrams illustrating an operation of processing a user utterance, according to various embodiments of the disclosure.

Figure 6:
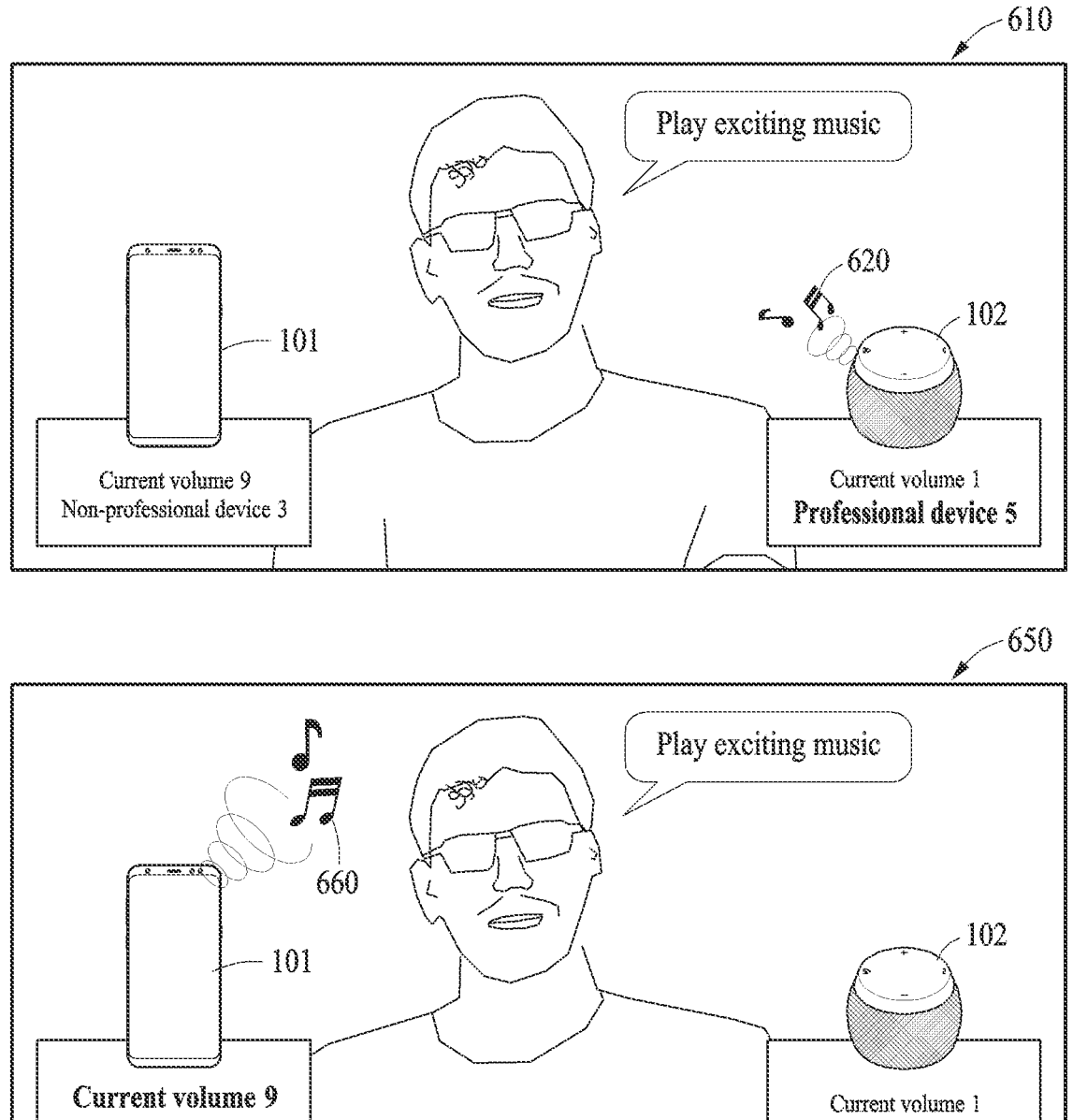
FIGS. 6, 7, 8, and 9 are diagrams illustrating an operation of processing a user utterance, according to various embodiments of the disclosure.

Referring to FIG. 6, an example embodiment of processing an utterance for music playing, for example, a target utterance "Play exciting music", is illustrated.

According to an embodiment of the disclosure, a user's target utterance "Play exciting music" may be input to any one of one or more electronic device, and the target utterance may be transmitted to the intelligent server 200. Although only the smart phone 101 and the intelligent speaker 102 are illustrated in FIG. 6 for brevity, as described with reference to FIG. 5, a target utterance may be input through various electronic devices such as a smart watch and a smart refrigerator, and the target utterance may be transmitted to the intelligent server 200.

Referring to FIG. 6, a situation 610 is a situation in which a target utterance is processed according to an existing scheme of determining a domain to process the utterance, after an electronic device to process the utterance is determined. The processor 520 of the intelligent server 200 may determine a target electronic device to process the received target utterance based on a predefined policy. For example, a device having a good wake-up reception sensitivity may be determined as a target electronic device, and priorities among various electronic devices may be predetermined. The intelligent server 200 may determine the intelligent speaker 102 among the smart phone 101, the intelligent speaker 102, and the smart TV (not shown) to be the target electronic device according to a predefined policy. After the electronic device is determined, the intelligent server 200 may classify a user intent using a capsule classifier corresponding to the electronic device, and may determine a capsule (or a domain) capable of processing the target utterance among capsules (or domains) corresponding to the electronic device.

However, in such scheme, the quality of service of the application that processes the utterance in the target electronic device may not be considered practically, and a processing result that does not match the user intent may be provided since the utterance is processed only based on the processing capability. For example, with respect to a target utterance "Tell me today's fortune", the processor 520 of the intelligent server 200 may determine a smart watch to be a target electronic device and process the utterance through a smart watch fortune domain. However, the fortune domain of the smart watch is a domain that generating a processing result of "This is a function that cannot be supported", and if utterances are processed as such, services that do not actually meet the user intent may be provided.

In the situation 610, the processor 520 may determine the intelligent speaker 102 to be the target electronic device according to a predefined policy, for example, a policy to process an utterance related to music with the intelligent speaker 102, a professional device, and determine a 'music app' capable of processing a music playing command among various applications included in the intelligent speaker 102 to be the target domain. Music may be played through a music app on the intelligent speaker 102. However, in the case of a scheme of determining an electronic device and determining a domain, the performance of an application performing an operation in the electronic device may not be considered. For example, in the situation 610, even though the current volume of the intelligent speaker 102 is set to 1, by determining the music app of the intelligent speaker in the intelligent server 200, the music 620 may be played at low volume on the intelligent speaker 102.

Referring to FIG. 6, a situation 650 involves processing an utterance based on an electronic device-domain combination. Based on the target utterance "Play exciting music" and the context information 540, the processor 520 of the intelligent server 200 may generate one or more combination of electronic device information and domain information capable of processing the target utterance. Whether the target utterance can be processed may be determined through the natural language platform 220 like the existing scheme. Although only the smartphone 101 and the intelligent speaker 102 are shown for brevity in FIG. 6, with respect to the target utterance "Play exciting music," the processor 520 may generate electronic device-domain combinations such as a smart refrigerator-music app, a smartphone-music app, a smart air conditioner-music app, and/or an intelligent speaker-music app combination. In the case of the smart air conditioner-music app combination, similar to what is described above with respect to the smart watch, a processing result of "This function cannot be supported" is generated, but the processor 520 may determine that the target utterance is a combination that can be processed.

The processor 520 may determine reference information for processing a target utterance among the context information 540. In the situation 650 of FIG. 6, with respect to the utterance "Play exciting music", the processor 520 may determine information on whether the electronic device is a professional device and current volume information of the electronic device among the electronic device information 541 of the context information 540 to be the reference information.

The processor 520 may calculate a quality of service score for each of one or more combination referring to reference information. For example, in the situation 650, the processor 520 may refer to the information on whether the electronic device is a professional device and the current volume information of the electronic device among the context information 540, and calculate the quality of service score for each of the smart refrigerator-music app, smartphone-music app, smart air conditioner-music app, and intelligent speaker-music app combinations. As described with reference to FIG. 5, the processor 520 may determine a controllability score, a functionality score, an accessibility score, and a functional performance robustness score for each combination, and calculate the quality of service score by the sum thereof.

In the situation 650, the processor 520 may determine a combination having the highest quality of service score to be the target combination. For example, the processor 520 may determine that the quality of service score of the smartphone-music app combination is the highest considering the information on whether the device is a professional device and the current volume information, and transmit a command to process the target utterance "Play exciting music" through a music app to the smartphone 101. Music may be played through the music app in the smartphone 101, based on the command 660.

Figure 7:
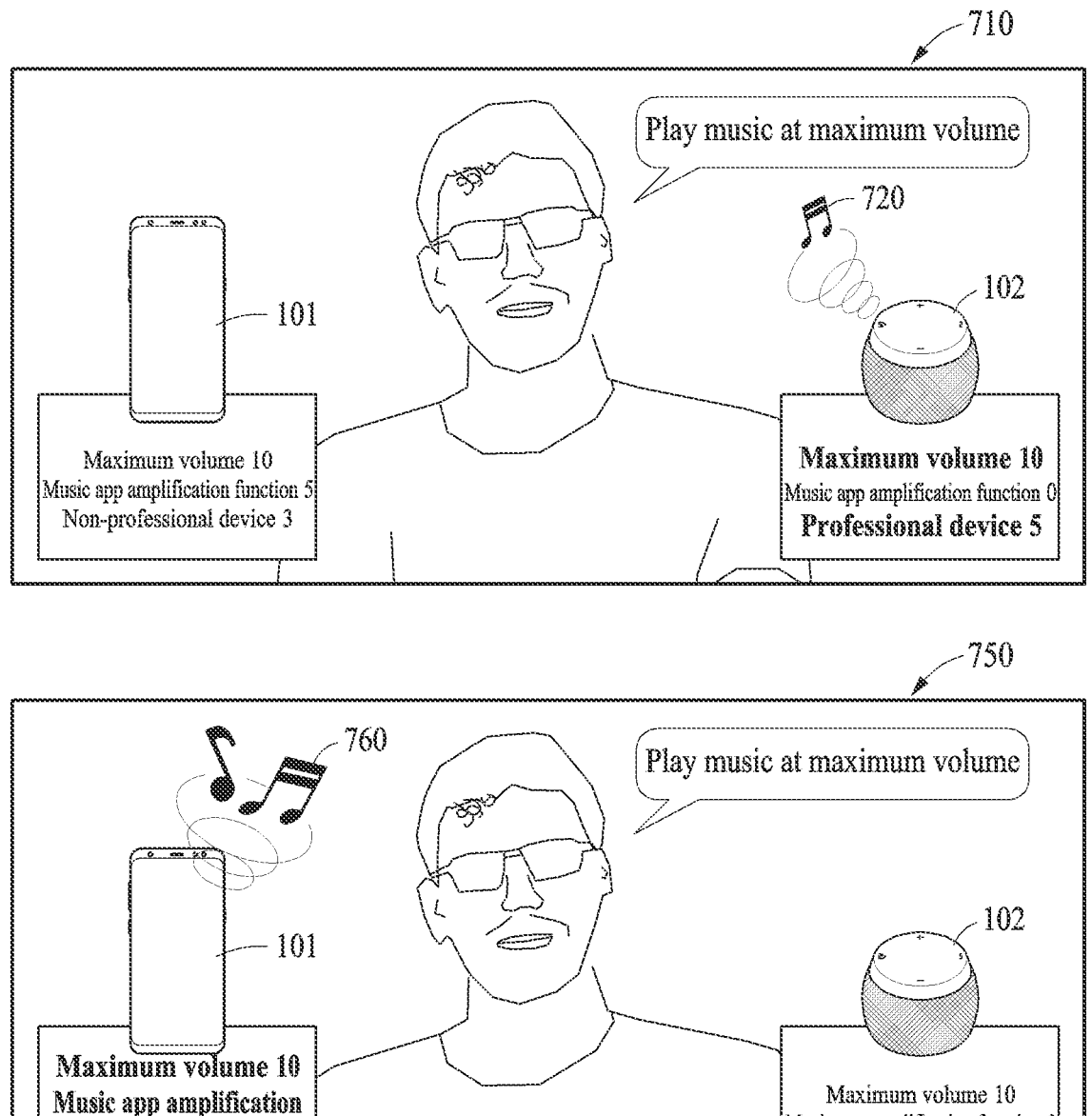

Referring to FIG. 7, an embodiment of processing an utterance to be played at maximum volume, for example, a target utterance "Play music at maximum volume", is illustrated.

According to an embodiment of the disclosure, a user's target utterance "Play music at maximum volume" may be input to any one of one or more electronic device, and the target utterance may be transmitted to the intelligent server 200. Although only the smarphone 101 and the intelligent speaker 102 are illustrated in FIG. 7 for brevity, as described with reference to FIG. 5, a target utterance may be received through various electronic devices such as a smart watch and a smart refrigerator and transmitted to the intelligent server 200.

Referring to FIG. 7, a situation 710 is a situation in which a target utterance is processed according to an existing scheme for determining a domain to process the utterance, after an electronic device to process the utterance is determined by the processor 520, as described with respect to the situation 610 of FIG. 6.

The processor 520 may determine the intelligent speaker 102 to be the target electronic device according to a predefined policy, for example, a policy to process an utterance related to music with the intelligent speaker 102, a professional device, and determine a 'music app' to be the target domain so that music may be played through the music app on the intelligent speaker 102. However, in the situation 710, although the maximum volume of the smarphone 101 is 10 and the maximum volume of the intelligent speaker 102 is 10 and the music app of the smartphone 101 may support the amplification function, the processor 520 may determine the intelligent speaker 102 to be the target electronic device. The processor 520 may determine to process an utterance through the music app through a user intent classification among domains corresponding to the intelligent speaker 102, and music may be played on the intelligent speaker 102 at maximum volume 720.

Referring to FIG. 7, a situation 750 involves processing an utterance based on an electronic device-domain combination. As described with respect to the situation 650 of FIG. 6, based on the target utterance "Play music at maximum volume" and the context information 540, the processor 520 of the intelligent server 200 may generate one or more combination of electronic device information and capsule information capable of processing the target utterance. Whether the target utterance can be processed may be determined through the natural language platform 220 like the existing scheme. Although only the smartphone 101 and the intelligent speaker 102 are shown for brevity in FIG. 7, with respect to the target utterance "Play music at maximum volume", the processor 520 may generate electronic device-domain combinations such as a smart refrigerator-music app, a smartphone-music app, a smart air conditioner-music app, and an intelligent speaker-music app combination.

The processor 520 may determine reference information for processing a target utterance among the context information 540. In the situation 750 of FIG. 7, with respect to the utterance "Play music at maximum volume", the processor 520 may determine information on whether the electronic device is a professional device and maximum volume information of the electronic device among the electronic device information 541 of the context information 540 to be the reference information, and determine information on whether a domain has an amplification function among the capsule information 543 (or corresponding domain information) to be the reference information.

The processor 520 may calculate a quality of service score for each of one or more combination referring to reference information. For example, in the situation 750, the processor 520 may refer to the information on whether the electronic device is a professional device, the maximum volume information, and the information on whether a domain has an amplification function among the context information 540, and calculate the quality of service score for each of the smart refrigerator-music app, smartphone-music app, smart air conditioner-music app, and intelligent speaker-music app combinations. For example, as described with reference to FIG. 5, the processor 520 may determine a controllability score, a functionality score, an accessibility score, and a functional performance robustness score for each combination, and calculate the quality of service score by the sum thereof.

In the situation 750, the processor 520 may determine a combination having the highest quality of service score to be the target combination. For example, the processor 520 may determine that the quality of service score of the smartphone-music app combination is the highest, and transmit a command to process the target utterance "Play music at maximum volume" through a music app to the smartphone 101. As the amplification function of the music app is used more in the smartphone 101, the music may be played at a higher volume 760 than the volume played 720 in the situation 710.

Figure 8:
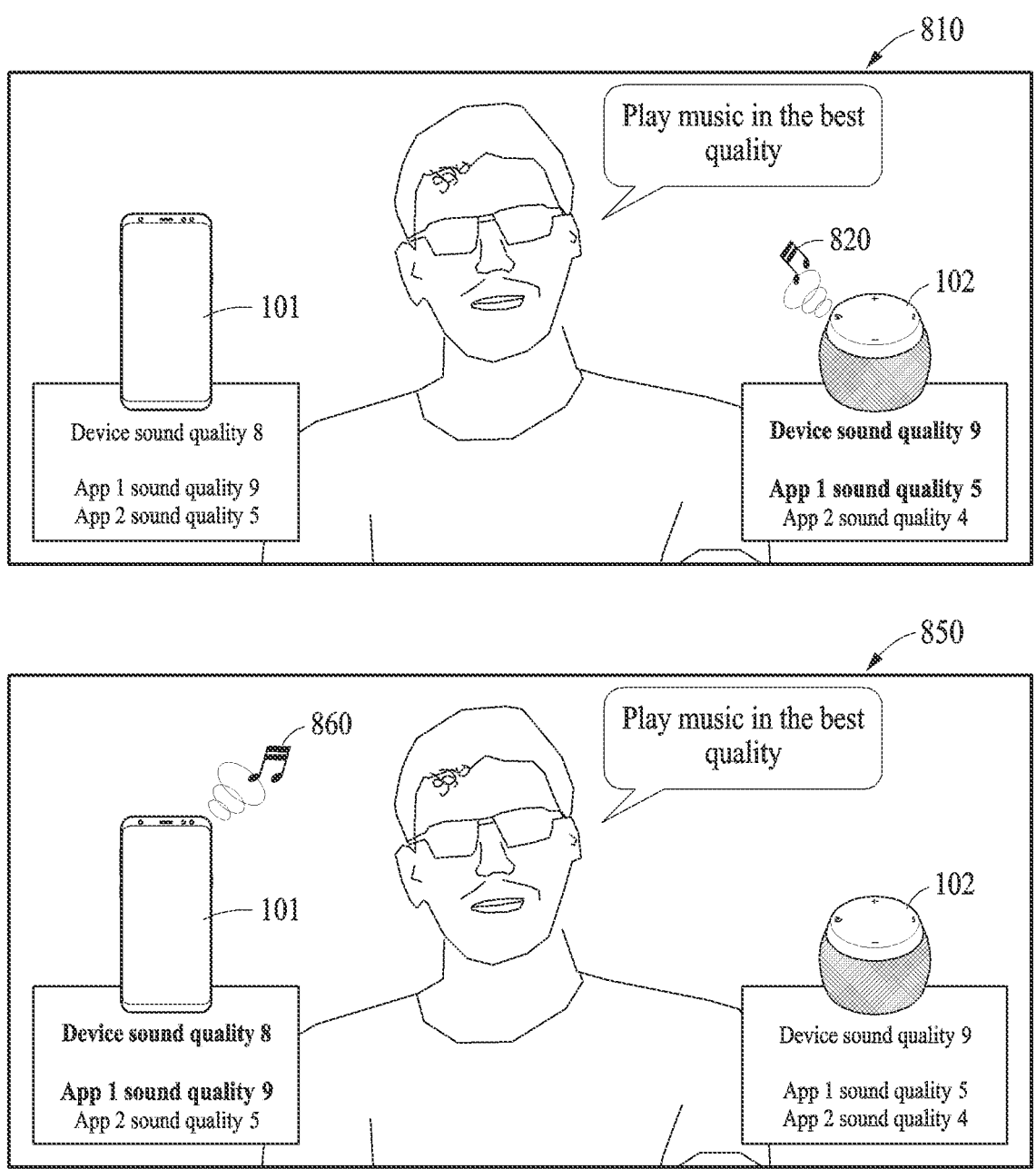

Referring to FIG. 8, an example embodiment of processing an utterance for sound quality, for example, a target utterance "Play music in the best quality", is illustrated.

According to an embodiment of the disclosure, a user's target utterance "Play music in the best quality" may be input to any one of one or more electronic device, and the target utterance may be transmitted to the intelligent server 200. Although only the smartphone 101 and the intelligent speaker 102 are illustrated in FIG. 8 for brevity, as described with reference to FIG. 5, a target utterance may be received through various electronic devices such as a smart watch or a smart refrigerator and transmitted to the intelligent server 200.

Referring to FIG. 8, a situation 810 is a situation in which a target utterance is processed according to an existing scheme for determining a domain to process the utterance, after an electronic device to process the utterance is determined by the processor 520, as described with respect to the situation 610 of FIG. 6 and the situation 710 of FIG. 7.

The processor 520 may determine the intelligent speaker 102 to be the target electronic device according to a predefined policy, for example, a policy to process an utterance related to music with the intelligent speaker 102, a professional device, and determine a 'music app' to be the target domain so that music may be played through the music app on the intelligent speaker 102. However, in the situation 810, although the sound quality of the intelligent speaker 102 is better than the sound quality of the smartphone 101, when the sound quality of the application is also considered, even though a smartphone 101-app 1 combination has the best sound quality, the processor 520 may determine the intelligent speaker 102 to be the target electronic device. The processor 520 may determine to process an utterance through the app 1 through a user intent classification among domains corresponding to the intelligent speaker 102, and music may be played on the intelligent speaker 102 through the app 1 820.

Referring to FIG. 8, a situation 850 involves processing an utterance based on an electronic device-domain combination. As described with respect to the situation 650 of FIG. 6 and the situation 750 of FIG. 7, based on the target utterance "Play music in the best quality" and the context information 540, the processor 520 of the intelligent server 200 may generate one or more combination of electronic device information and capsule information capable of processing the target utterance. Whether the target utterance can be processed may be determined through the natural language platform 220 like the existing scheme. Although only the smartphone 101 and the intelligent speaker 102 are shown for brevity in FIG. 8, with respect to the target utterance "Play music in the best quality", the processor 520 may generate electronic device-domain combinations such as a smart refrigerator-music app, a smartphone-app 1, a smartphone-app 2, a smart air conditioner-music app, an intelligent speaker-app 1, and an intelligent speaker-app 2 combination.

The processor 520 may determine reference information for processing a target utterance among the context information 540. In the situation 850 of FIG. 8, with respect to the utterance "Play music in the best quality", the processor 520 may determine information on sound quality of the electronic device among the electronic device information 541 of the context information 540 to be the reference information, and determine information on sound quality among the capsule information 543 (or corresponding domain information) to be the reference information.

The processor 520 may calculate a quality of service score for each of one or more combination referring to reference information. For example, in the situation 850, the processor 520 may refer to the information on sound quality of the electronic device and information on sound quality of a domain among the context information 540, and calculate the quality of service score for each of the smart refrigerator-music app, smartphone-app 1, smartphone-app 2, smart air conditioner-music app, intelligent speaker-app 1, and intelligent speaker-app 2 combinations. For example, as described with reference to FIG. 5, the processor 520 may determine a controllability score, a functionality score, an accessibility score, and a functional performance robustness score for each combination, and calculate the quality of service score by the sum thereof.

In the situation 850, the processor 520 may determine a combination having the highest quality of service score to be the target combination. For example, the processor 520 may determine that the quality of service score of the smart-phone-app 1 combination is the highest, and transmit a command to the smartphone 101, to process the target utterance "Play music in the best quality" through the app 1 of the smartphone 101. Music may be played through the app 1 860 in the smartphone 101.

Figure 9:
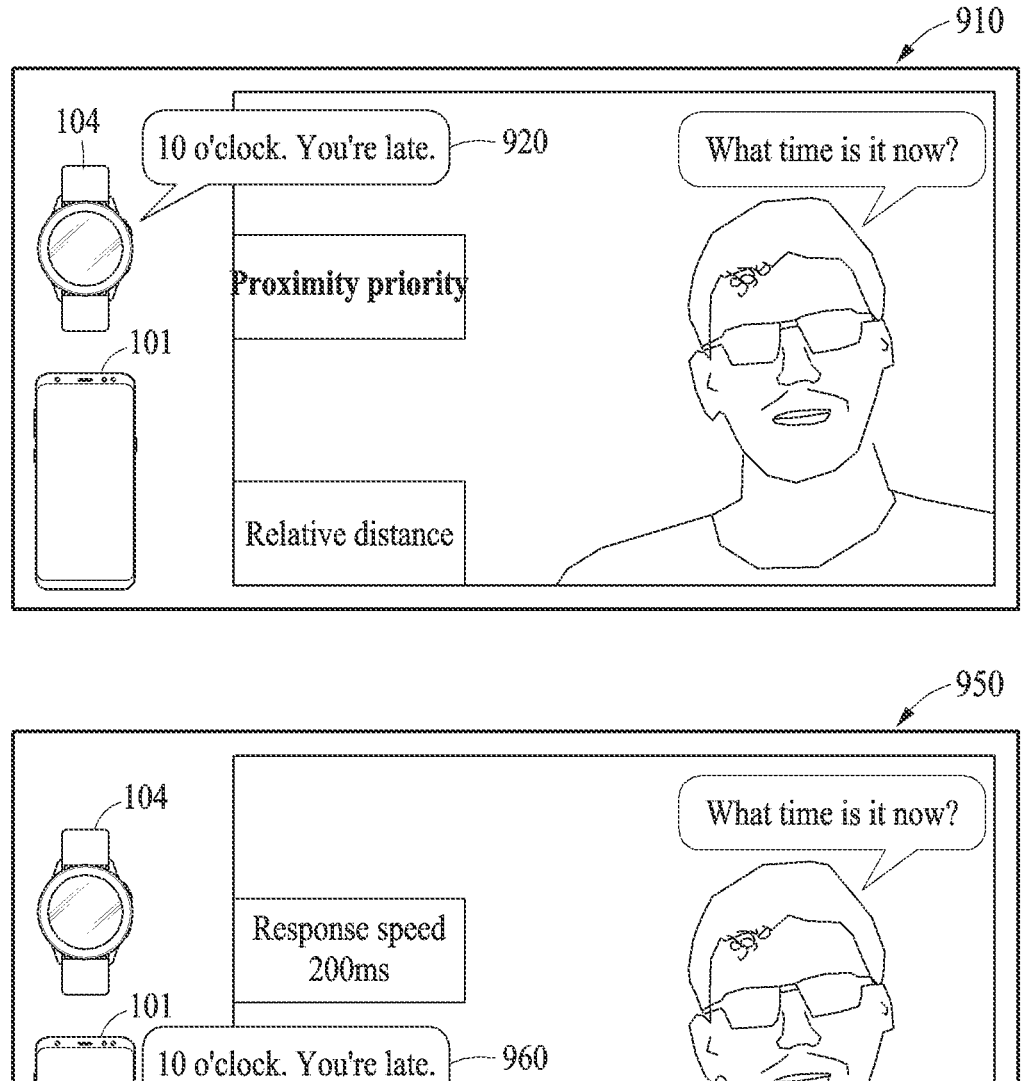

Referring to FIG. 9, an example embodiment of process-ing a target utterance "What time is it now?" is illustrated.

According to an embodiment of the disclosure, a user's target utterance "What time is it now?" may be input to any one of one or more electronic device, and the target utterance may be transmitted to the intelligent server 200. Although only the smanphone 101 and the smart watch 104 are illustrated in FIG. 9 for brevity, as described with reference to FIG. 5, a target utterance may be received through various electronic devices such as an intelligent speaker or a smart refrigerator and transmitted to the intelligent server 200.

Referring to FIG. 9, a situation 910 is a situation in which a target utterance is processed according to an existing scheme of determining a domain to process the utterance, after an electronic device to process the utterance is deter-mined by the processor 520, as described with respect to the situation 610 of FIG. 6.

The processor 520 may determine the smart watch 104 to be the target electronic device according to a predefined policy, for example, a policy to process an utterance with a nearby device, and determine a 'watch app' to be the target domain and process the utterance 920 through the watch app of the smart watch 104. However, the domain performance, for example, response time, is not considered in this example, and when the utterance 920 is processed by the smart watch 104, the processing speed may be relatively slow.

A situation 950 involves processing an utterance based on an electronic device-domain combination. As described with respect to the situation 650 of FIG. 6, based on the target utterance "What time is it now?" and the context informa-tion 540, the processor 520 of the intelligent server 200 may generate one or more combination of electronic device information and capsule information capable of processing the target utterance. Whether the target utterance can be processed may be determined through the natural language platform 220 like the existing scheme. Although only the smartphone 101 and the smart watch 104 are shown for brevity in FIG. 9, with respect to the target utterance "What time is it now?", the processor 520 may generate electronic device-domain combinations such as a smart refrigerator-watch app, a smartphone-watch app, a smart air conditioner-watch app, and an intelligent speaker-watch app combina-tion.

The processor 520 may determine reference information for processing a target utterance among the context infor-mation 540. Information determined according to an elec-tronic device (e.g., the smartphone 101 or the smart watch 104 of FIG. 9) independently of a domain (e.g., a watch app), such as a response time, may be determined as reference information. For example, in the situation 950 of FIG. 9, with respect to the utterance "What time is it now?", the processor 520 may determine information on a response time among the capsule information 543 (or corresponding domain information) of the context information 540 to be reference information.

The processor 520 may calculate a quality of service score for each of one or more combination referring to reference information. For example, in the situation 950, the processor 520 may refer to the information on the response time of a domain among the context information 540, and calculate the quality of service score for each of the smart refrigerator-watch app, smartphone-watch app, smart air conditioner-watch app, and intelligent speaker-watch app combinations, referring to the reference information which is the informa-tion on the response time. For example, referring to the situation 950 of FIG. 9, a response speed of the smart watch 104 is 200 ms and a response speed of the smartphone 101 is 30 ms, so the processor 520 may determine the quality of service score for the smartphone-watch app to be higher than the quality of service score for the smart watch-watch app. As described with reference to FIG. 5, the processor 520 may determine a controllability score, a functionality score, an accessibility score, and a functional performance robust-ness score for each combination, and calculate the quality of service score by the sum thereof.

According to an example embodiment, in the situation 950, the processor 520 may determine a combination having the highest quality of service score to be the target combi-nation. For example, the processor 520 may determine that the quality of service score of the smartphone-watch app combination is the highest, and transmit a command to process the target utterance "What time is it now?" through a watch app to the smartphone 101. The smartphone 101 may output a result of processing the utterance "What time is it now?" through the watch app 960.

The processor 520 may process an utterance more con-forming to a user intent by determining the electronic device and domain to process the utterance referring to the target utterance and context information 540. For example, utter-ances related to personal information, such as text messages or phone calls, may be more consistent with the user intent when processed by a personal device such as a smartphone rather than a public device such as a smart TV or an intelligent speaker. The processor 520 of the intelligent server 200 may determine, through the electronic device information 541 of the context information 540, that an electronic device is a family device when a plurality of accounts are logged into the electronic device, and may generate combinations such as an intelligent speaker-phone app and smartphone-phone app combination, capable of processing a target utterance "Call mom". As described with reference to FIG. 5, the function performance robustness factor may be considered in the process of calculating the quality of service score, and the quality of service score of the smartphone-phone app combination, which is a personal device, may be calculated to be higher compared to the intelligent speaker-phone app combination. The intelligent server 200 may transmit a command to process the utterance "Call mom" through a phone app to the smartphone, and the utterance may be processed by the phone app of the smart-phone.

As a target utterance is processed based on an electronic device-domain combination, a user intent may be classified only once without need to classify the user intent for each electronic device, so that processing of referential pronouns such as 'this', 'the', 'that', and 'like' in subsequent utter-ances may be improved. As described above with reference to FIG. 5, since the processor 520 of the intelligent server

200 processes an utterance referring to the electronic device information 541 and the capsule information 543 (or domain information) in the context information 540, processing subsequent utterances through another electronic device may be relatively easy.

For example, after the utterance "Search for Changdeok-gung on TV", the subsequent utterance "Search for the same thing on personal computer (PC)" may be transmitted to the intelligent server 200. Information indicating that 'Changdeokgung' has been searched for on an electronic device called TV may be included in the context information 540 as instant context information described with reference to FIG. 5, and when processing the subsequent target utterance "Search for the same thing on PC", the processor 520 may determine that 'the same thing' is "Changdeokgung" of the previous utterance.

As described with reference to FIG. 5, the electronic device 101 may include on-device AI, and the various operations of the processor 520 described with reference to FIGS. 6 to 9 may be performed by the processor 120 of the electronic device 101 without communication with the intelligent server 200.

Operating Method of Intelligent Server

FIG. 10 is a flowchart illustrating an operation of processing an utterance by an intelligent server, according to an embodiment of the disclosure.

Referring to FIG. 10, operations 1010 to 1060 may be performed by the processor 520 of the intelligent server 200 described above with reference to FIG. 5. Therefore, the description provided with reference to FIGS. 1 to 9 will not be repeated for conciseness.

In operation 1010, the processor 520 may receive a target utterance from any one or more of the electronic devices 101, 102, and 104. For example, as described with reference to FIG. 7, the processor 520 may receive a target utterance "Play music at maximum volume".

In operation 1020, based on the target utterance and the context information 540, the processor 520 may generate one or more electronic device information-domain information combination capable of processing the target utterance. For example, as described with reference to FIG. 7, with respect to the target utterance "Play music at maximum volume", the processor 520 may generate electronic device-domain combinations such as a smart refrigerator-music app, a smartphone-music app, a smart air conditioner-music app, and an intelligent speaker-music app combination capable of processing the target utterance.

In operation 1030, the processor 520 may determine reference information for calculating a quality of service score among the context information 540, based on the target utterance. For example, as described with reference to FIG. 7, with respect to the utterance "Play music at maximum volume", the processor 520 may determine information on whether the electronic device is a professional device and maximum volume information of the electronic device among the electronic device information 541 of the context information 540 to be the reference information, and determine information on whether a domain has an amplification function among the capsule information 543 (or corresponding domain information) to be the reference information.

In operation 1040, the processor 520 may calculate a quality of service score for each one or more electronic device information-domain information combination referring to the reference information. For example, as described with reference to FIG. 7, the processor 520 may refer to the information on whether the electronic device is a professional device, the maximum volume information, and the information on whether a domain has an amplification function among the context information 540, and calculate the quality of service score for each of the smart refrigerator-music app, smartphone-music app, smart air conditioner-music app, and intelligent speaker-music app combinations. As described with reference to FIG. 5, in operation 1040, the processor 520 may determine a controllability score, a functionality score, an accessibility score, and a functional performance robustness score for each combination, and calculate the quality of service score by the sum thereof.

In operation 1050, the processor 520 may determine a target combination of a target electronic device and a target domain based on the quality of service score. For example, as described with reference to FIG. 7, the processor 520 may determine that the quality of service score of a smartphone-music app combination is the highest.

In operation 1060, the processor 520 may transmit a command to process a target utterance with a target domain to the target electronic device. For example, as described with reference to FIG. 7, the processor 520 may transmit a command to process the target utterance "Play music at maximum volume" through a music app to the smartphone 101. Music may be played to the maximum through the music app in the smartphone 101.

Operations similar to operations 1010 to 1060 may be performed by the processor 120 of the electronic device 101. As described above with reference to FIG. 5, the electronic device 101 may include an on-device AI for processing a user utterance without communication with the intelligent server 200. For example, the on-device AI may have a configuration similar to or same as configurations of the natural language platform 220 and the capsule DB 230 of the intelligent server 200. The processor 120 may receive the target utterance from the user, determine a target combination of a target electronic device and a target domain to process the target utterance as in operations 1020 to 1050, and transmit a command to process the target utterance with the target domain, to the target electronic device as in operation 1060.

According to an embodiment of the disclosure, an intelligent server 200 for processing a user utterance may include: a memory 530 configured to store context information 540 including information 541 on each of one or more of electronic devices 101, 102, and 104 and information 543 on one or more domain corresponding to each of the one or more of electronic devices 101, 102, and 104, and computer-executable instructions; and a processor 520 configured to execute the instructions by accessing the memory 530, wherein the instructions may be further configured to: based on a target utterance received from any one of the one or more of electronic devices 101, 102, and 104 and the context information 540, generate one or more combination of electronic device information 541 and domain information 543 capable of processing the target utterance; determine reference information for processing the target utterance among the context information 540, and calculate a quality of service score for each of the one or more combination referring to the reference information; determine a target combination of a target electronic device and a target domain corresponding to the target electronic device based on the quality of service score; and transmit a command to process the target utterance with the target domain, to the target electronic device.

The instructions may be configured to, when the target utterance is an utterance related to playing music, determine information on whether an electronic device is a professional device and current volume information of the electronic device, to be the reference information.

The instructions may be configured to, when the target utterance is an utterance for playing at maximum volume, determine information on whether an electronic device is a professional device, maximum volume information of the electronic device, and information on whether a domain has an amplification function, to be the reference information.

The instructions may be configured to, when the target utterance is an utterance for sound quality, determine information on sound quality of the electronic device and information on sound quality of the domain, to be the reference information.

The context information 540 may include permanent context information that does not change in real time and instant context information that changes in real time.

The permanent context information may include at least one of network information on one or more of electronic devices 101, 102, and 104, account information on one or more of electronic devices 101, 102, and 104, information on whether each of the one or more of electronic devices 101, 102, and 104 is a professional device, and performance information on one or more domain.

The instant context information may include at least one of user preference information of one or more domain, execution history information of one or more domain, and utterance history information received by the one or more of electronic devices 101, 102, and 104.

The domain may be software for processing an utterance through the corresponding electronic device and may include at least one of an application, a program for providing a service in a form of a widget, and a web app.

The instructions may be configured to calculate the quality of service score by a sum of a controllability score, a functionality score, an accessibility score, and a functional performance robustness score for each of the one or more domain corresponding to each of the one or more of electronic devices 101, 102, and 104.

According to an embodiment of the disclosure, a method for processing a user utterance in an intelligent server 200 may include: receiving a target utterance from any one of one or more of electronic devices 101, 102, and 104; generating one or more combination of electronic device information 541 and domain information 543, capable of processing the target utterance, based on the target utterance and context information 540, the context information 540 including information 541 on each of the one or more of electronic devices 101, 102, and 104 and information 543 on one or more domain corresponding to each of the one or more of electronic devices 101, 102, and 104; determining reference information for processing the target utterance among the context information 540; calculating a quality of service score for each of the one or more combination referring to the reference information; determining a target combination of a target electronic device and a target domain corresponding to the target electronic device based on the quality of service score; and transmitting a command to process the target utterance with the target domain, to the target electronic device.

The determining of the reference information may include, when the target utterance is an utterance related to playing music, determining information on whether an electronic device is a professional device and current volume information of the electronic device, to be the reference information.

The determining of the reference information may include, when the target utterance is an utterance for playing at maximum volume, determining information on whether an electronic device is a professional device, maximum volume information of the electronic device, and information on whether a domain has an amplification function, to be the reference information.

The determining of the reference information may include, when the target utterance is an utterance for sound quality, determining information on sound quality of the electronic device and information on sound quality of the domain, to be the reference information.

The context information 540 may include permanent context information that does not change in real time and instant context information that changes in real time.

The permanent context information may include at least one of network information on one or more of electronic devices 101, 102, and 104, account information on one or more of electronic devices 101, 102, and 104, information on whether each of the one or more of electronic devices 101, 102, and 104 is a professional device, and performance information on one or more domain.

The instant context information may include at least one of user preference information of one or more domain, execution history information of one or more domain, and utterance history information received by the one or more of electronic devices 101, 102, and 104.

According to an embodiment of the disclosure, an electronic device 101 for processing a user utterance may include: a memory 130 configured to store context information 540 including information 541 on each of one or more of electronic devices 101, 102, and 104 including the electronic device 101 and information 543 on one or more domain corresponding to each of the one or more of electronic devices 101, 102, and 104, and computer-executable instructions; and a processor 120 configured to execute the instructions by accessing the memory 130, wherein the instructions may be further configured to: based on a target utterance received from the electronic device 101 and the context information 540, generate one or more combination of electronic device information 541 and domain information 543 capable of processing the target utterance; determine reference information for processing the target utterance among the context information 540, and calculate a quality of service score for each of the one or more combination referring to the reference information; determine a target combination of a target electronic device and a target domain corresponding to the target electronic device based on the quality of service score; and transmit a command to process the target utterance with the target domain, to the target electronic device.

The instructions may be configured to, when the target utterance is an utterance related to playing music, determine information on whether an electronic device is a professional device and current volume information of the electronic device, to be the reference information.

The instructions may be configured to, when the target utterance is an utterance for playing at maximum volume, determine information on whether an electronic device is a professional device, maximum volume information of the electronic device, and information on whether a domain has an amplification function, to be the reference information.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An intelligent server for processing a user utterance, the server comprising:

memory storing instructions; and at least one processor including processing circuitry, wherein the instructions that, when executed by the at least one processor individually or collectively, cause the server to:

based on a target utterance received from any one of at least one electronic device and context information comprising information on each of at least one electronic device and information on at least one domain corresponding to each of the at least one electronic device, generate at least one combination of electronic device information and domain information capable of processing the target utterance, determine reference information among the context information based on the target utterance, calculate a quality of service (QoS) score for each of the at least one combination referring to the reference information, determine a target combination of a target electronic device and a target domain corresponding to the target electronic device based on the QoS score, and transmit a command to process the target utterance with the target domain, to the target electronic device, wherein the calculating of the QoS score includes:

calculating a controllability score for each of the at least one combination based on specification information of each of at least one electronic device and on whether at least one domain supports a function associated with the target utterance; and calculating the QoS score by a sum of the controllability score, a functionality score, an accessibility score, and a functional performance robustness score for each of the at least one domain corresponding to each of the at least one electronic device, and wherein the controllability score is associated with a degree of a controllability of each of the at least one combination, the functionality score is associated with sharing frequency of each of the at least one combination, the accessibility score is associated with complexity of authentication of each of the at least one combination, and the functional performance robustness score is associated with a collision between domains.

2. The server of claim 1, wherein the context information comprises permanent context information that does not change in real time and instant context information that changes in real time.

3. The server of claim 2, wherein the permanent context information comprises at least one of network information on the at least one electronic device, account information on the at least one electronic device, information on whether the at least one electronic device is a professional device, and performance information on the at least one domain.

4. The server of claim 2, wherein the instant context information comprises at least one of user preference information of the at least one domain, execution history information of the at least one domain, and utterance history information received by the at least one electronic device.

5. The server of claim 1, wherein the instructions that, when executed by the at least one processor individually or collectively, further cause the electronic device to, in response to the target utterance being an utterance related to playing music, determine information on whether an electronic device is a professional device and current volume information of the electronic device, to be the reference information.

6. The server of claim 1, wherein the instructions that, when executed by the at least one processor individually or collectively, further cause the electronic device to, in response to the target utterance being an utterance for playing at maximum volume, determine information on whether an electronic device is a professional device, maximum volume information of the electronic device, and information on whether a domain has an amplification function, to be the reference information.

7. The server of claim 1, wherein the instructions that, when executed by the at least one processor individually or collectively, further cause the electronic device to, in response to the target utterance being an utterance for sound quality, determine information on sound quality of the electronic device and information on sound quality of the domain, to be the reference information.

8. The server of claim 1, wherein the domain is software configured to process an utterance through a corresponding electronic device, and wherein the software comprises at least one of an application, a program for providing a service in a form of a widget, and a web app.

9. A method for processing a user utterance in an intelligent server, the method comprising:

receiving a target utterance from any one of at least one electronic device;

generating at least one combination of electronic device information and domain information, capable of processing the target utterance, based on the target utterance and context information, the context information including information on each of the at least one electronic device and information on at least one domain corresponding to each of the at least one electronic device;

determining reference information among the context information based on the target utterance;

calculating a quality of service (QoS) score for each of the at least one combination referring to the reference information;

determining a target combination of a target electronic device and a target domain corresponding to the target electronic device based on the QoS score; and transmitting a command to process the target utterance with the target domain, to the target electronic device, wherein the calculating of the QoS score includes:

calculating a controllability score for each of the at least one combination based on specification information of each of at least one electronic device and on whether at least one domain supports a function associated with the target utterance; and calculating the QoS score by a sum of the controllability score, a functionality score, an accessibility score, and a functional performance robustness score for each of the at least one domain corresponding to each of the at least one electronic device, and wherein the controllability score is associated with a degree of a controllability of each of the at least one combination, the functionality score is associated with sharing frequency of each of the at least one combination, the accessibility score is associated with complexity of authentication of each of the at least one combination, and the functional performance robustness score is associated with a collision between domains.

10. The method of claim 9, wherein the context information comprises permanent context information that does not change in real time and instant context information that changes in real time.

11. The method of claim 10, wherein the permanent context information comprises at least one of network information on the at least one electronic device, account information on the at least one electronic device, information on whether the at least one electronic device is a professional device, and performance information on the at least one domain.

12. The method of claim 10, wherein the instant context information comprises at least one of user preference information of the at least one domain, execution history information of the at least one domain, and utterance history information received by the at least one electronic device.

13. The method of claim 9, wherein the determining of the reference information comprises, in response to the target utterance being an utterance related to playing music, determining information on whether an electronic device is a professional device and current volume information of the electronic device, to be the reference information.

14. The method of claim 9, wherein the determining of the reference information comprises, in response to the target utterance being an utterance for playing at maximum volume, determining information on whether an electronic device is a professional device, maximum volume information of the electronic device, and information on whether a domain has an amplification function, to be the reference information.

15. The method of claim 9, wherein the determining of the reference information comprises, in response to the target utterance being an utterance for sound quality, determining information on sound quality of the electronic device and information on sound quality of the domain, to be the reference information.

16. A non-transitory computer-readable storage medium storing instructions that, when executed by a processor, cause the processor to perform a method comprising:

receiving a target utterance from any one of at least one electronic device;

generating at least one combination of electronic device information and domain information, capable of processing the target utterance, based on the target utterance and context information, the context information including information on each of the at least one electronic device and information on at least one domain corresponding to each of the at least one electronic device;

determining reference information among the context information based on the target utterance;

calculating a quality of service (QoS) score for each of the at least one combination referring to the reference information;

determining a target combination of a target electronic device and a target domain corresponding to the target electronic device based on the QoS score; and transmitting a command to process the target utterance with the target domain, to the target electronic device, wherein the calculating of the QoS score includes:

calculating a controllability score for each of the at least one combination based on specification information of each of at least one electronic device and on whether at least one domain supports a function associated with the target utterance; and calculating the QoS score by a sum of the controllability score, a functionality score, an accessibility score, and a functional performance robustness score for each of the at least one domain corresponding to each of the at least one electronic device, and wherein the controllability score is associated with a degree of a controllability of each of the at least one combination, the functionality score is associated with sharing frequency of each of the at least one combination, the accessibility score is associated with complexity of authentication of each of the at least one combination, and the functional performance robustness score is associated with a collision between domains.

17. An electronic device for processing a user utterance, comprising:

memory storing computer-executable instructions; and at least one processor including processing circuitry, wherein the instructions that, when executed by the at least one processor individually or collectively, cause the electronic device to:

based on a target utterance received from at least one electronic device and context information comprising information on each of at least one electronic device comprising the electronic device and information on at least one domain corresponding to each of the at least one electronic device, generate at least one combination of electronic device information and domain information capable of processing the target utterance, determine reference information for processing the target utterance among the context information, calculate a quality of service (QoS) score for each of the at least one combination referring to the reference information, determine a target combination of a target electronic device and a target domain corresponding to the target electronic device based on the QoS score, and transmit a command to process the target utterance with the target domain, to the target electronic device, wherein the calculating of the QoS score includes:

calculating a controllability score for each of the at least one combination based on specification information of each of at least one electronic device and on whether at least one domain supports a function associated with the target utterance; and calculating the QoS score by a sum of the controllability score, a functionality score, an accessibility score, and a functional performance robustness score for each of the at least one domain corresponding to each of the at least one electronic device, and wherein the controllability score is associated with a degree of controllability of each of the at least one combination, the functionality score is associated with sharing frequency of each of the at least one combination, the accessibility score is associated with complexity of authentication of each of the at least one combination, and the functional performance robustness score is associated with a collision between domains.

18. The electronic device of claim 17, wherein the instructions that, when executed by the at least one processor individually or collectively, further cause the electronic device to, in response to the target utterance being an utterance related to playing music, determine information on whether an electronic device is a professional device and current volume information of the electronic device, to be the reference information.

19. The electronic device of claim 17, wherein the instructions that, when executed by the at least one processor individually or collectively, further cause the electronic device to, in response to the target utterance being an utterance for playing at maximum volume, determine information on whether an electronic device is a professional device, maximum volume information of the electronic device, and information on whether a domain has an amplification function, to be the reference information.

20. The electronic device of claim 17, further comprising:

a memory configured to store a database including the context information and the domain information.

21. The electronic device of claim 17, wherein the memory is further configured to store information on follow-up actions to be presented to the user.

22. The electronic device of claim 17, wherein the reference information includes information on a response time for processing the target utterance.

* * * * *